United States Patent
Schaefer

[15] 3,687,210
[45] Aug. 29, 1972

[54] POWER TRAIN CONTROL SYSTEM
[72] Inventor: Robert H. Schaefer, Westfield, Ind.
[73] Assignee: General Motors Corporation, Detroit, Mich.
[22] Filed: Aug. 3, 1970
[21] Appl. No.: 60,453

Related U.S. Application Data

[62] Division of Ser. No. 779,502, Nov. 27, 1968, Pat. No. 3,640,157.

[52] U.S. Cl. ............................. 180/6.44, 74/720.5
[51] Int. Cl. .......................................... B62d 11/10
[58] Field of Search ............. 180/6.44, 6.7, 6.2, 6.48; 74/720.5

[56] References Cited

UNITED STATES PATENTS

| | | | |
|---|---|---|---|
| 3,403,583 | 10/1968 | Maci et al. | 74/720.5 |
| 3,306,385 | 2/1967 | Kempson | 180/6.48 |
| 3,373,636 | 3/1968 | Livezy et al. | 180/6.7 |
| 3,378,119 | 4/1968 | Schaefer | 180/6.7 X |

*Primary Examiner*—Benjamin Hersh
*Assistant Examiner*—John A. Pekar
*Attorney*—E. W. Christen, A. M. Heiter and R. L. Phillips

[57] ABSTRACT

A control system is shown for a multispeed forward and reverse track-laying vehicle power train, the control system having a manual forward and reverse control for effecting manual shifts between forward and reverse, a manual drive range control and an automatic drive range shifting operation and a steering control for effecting steering operation. The manual forward and reverse control provides selection between forward and reverse drive in the lowest drive range and prevents such shifting by the operator in all of the higher drive ranges. The manual drive range control provides selection between the drive ranges with the selected drive range being established immediately on an upshift and by speed governed automatic shifting operation on a downshift. The automatic drive range control provides automatic shifting using separate speed controlled upshift biases, an engine torque demand controlled upshift inhibiting bias and an engine torque demand controlled downshift bias. Both the manual forward and reverse control and the manual drive range control are electrically activated and in the event there is an interruption in electrical power, the directional drive selected by the manual forward and reverse control is maintained while the range control, if under manual control is automatically conditioned for automatic control to maintain power train control. A sequence control is effective to disengage the range drive to the load in the lowest drive range during shifting between forward and reverse to provide for engagement of the directional drive under no-load conditions. The steer control operates on a hydrostatic unit to control steering by controlling hydrostatic pump displacement while assuring straight vehicle no-drift motion when there is no steer demand. The controlling force effecting this pump displacement control is varied according to hydrostatic pump output to meet the varying steer load demands in both directions of steer. There is also provided a stroke or pump displacement limiter for limiting pump displacement regardless of the steer demanded by the operator to prevent pump overload. Hydrostatic system pressure is controlled by a pressure relief control in accordance with engine torque demand and vehicle speed to both prevent overloading of the hydrostatic pump and limit the degree of steer bias. The steer control signals the range control to inhibit automatic range shifting during steering operation. The hydrodynamic torque converter in the power train has a lockup drive which is normally disengaged on range shifting and is held engaged during low speed operation in each range to provide for utilization of vehicle momentum to provide power for steering while preventing engine stall.

5 Claims, 9 Drawing Figures

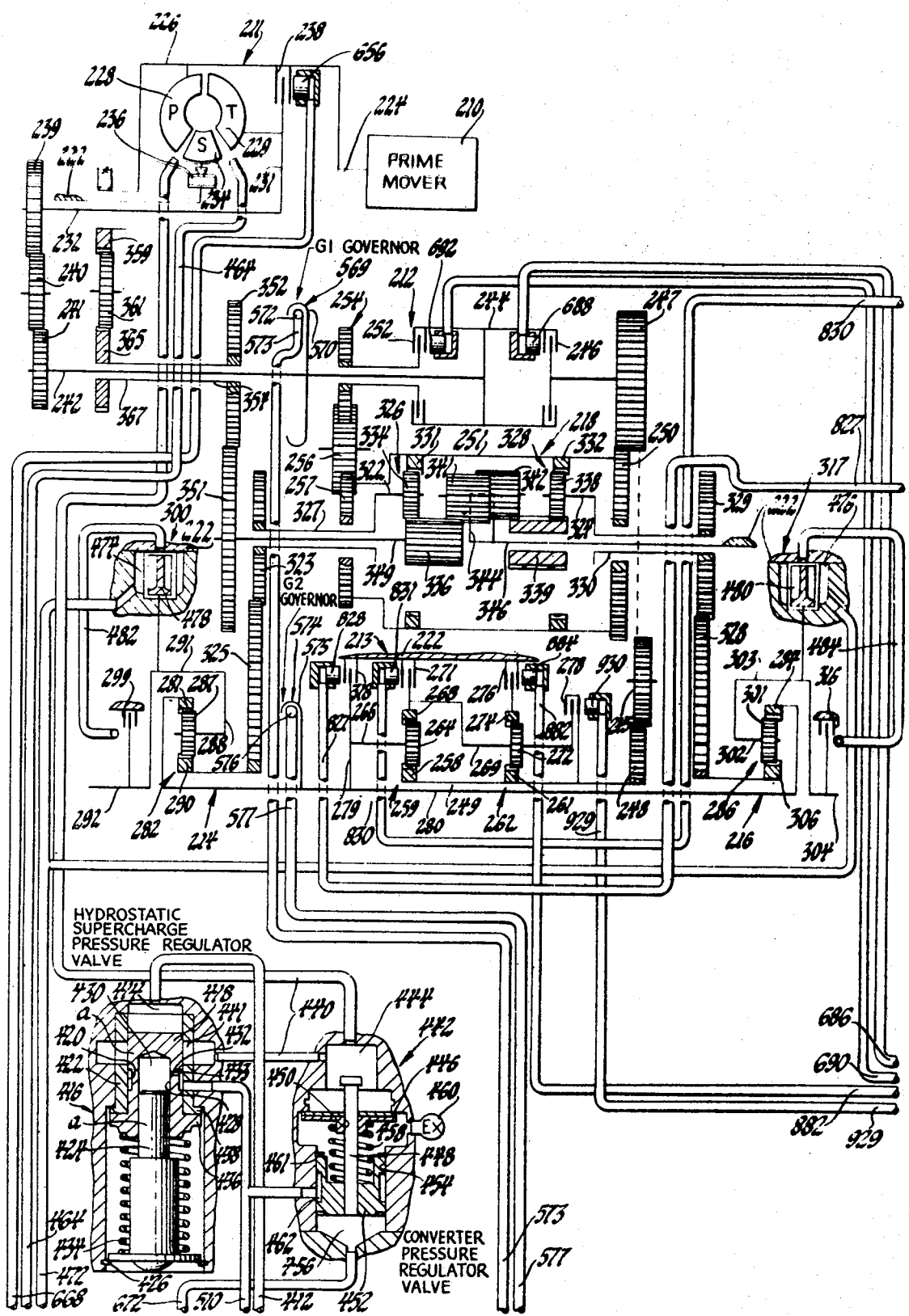

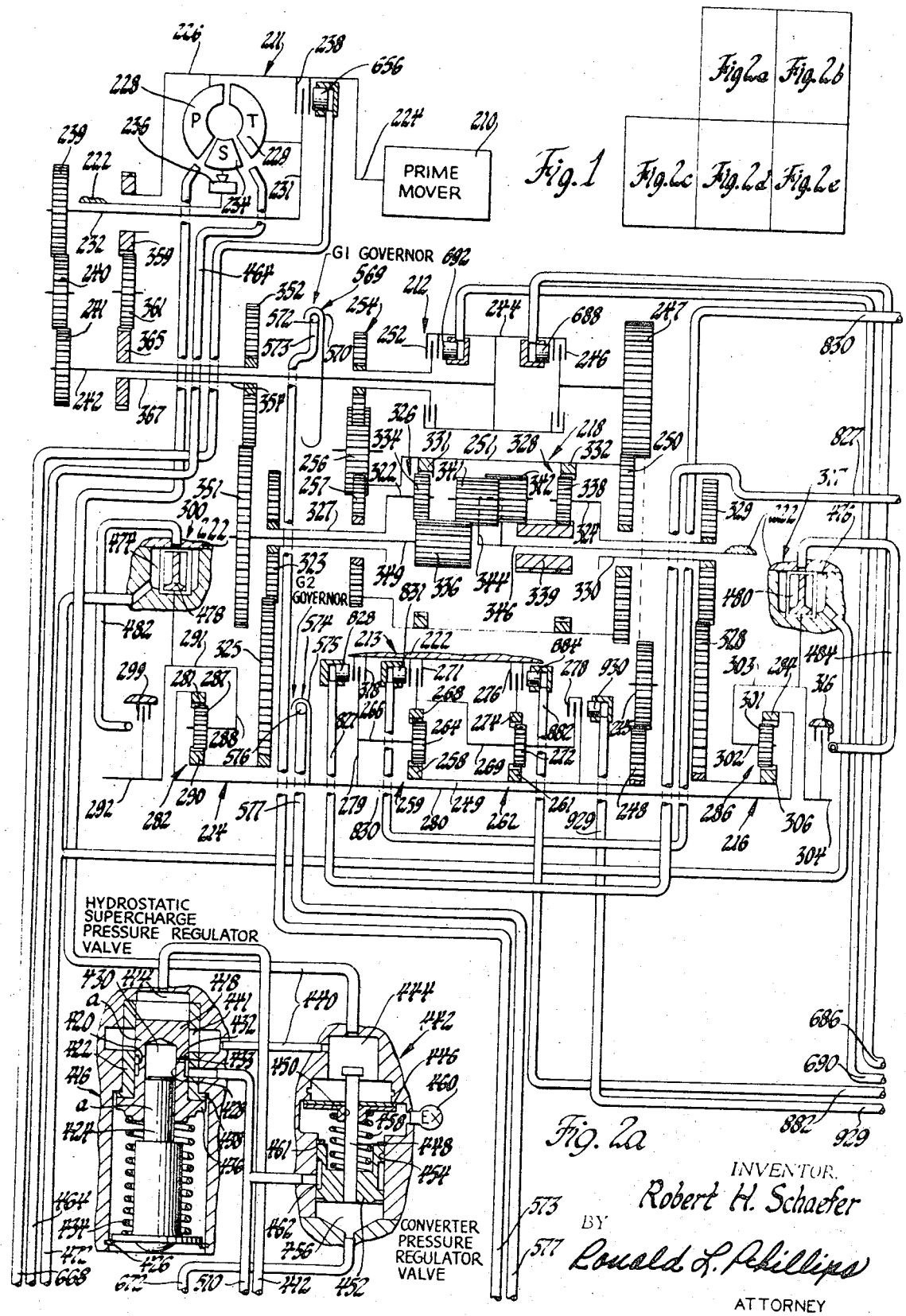

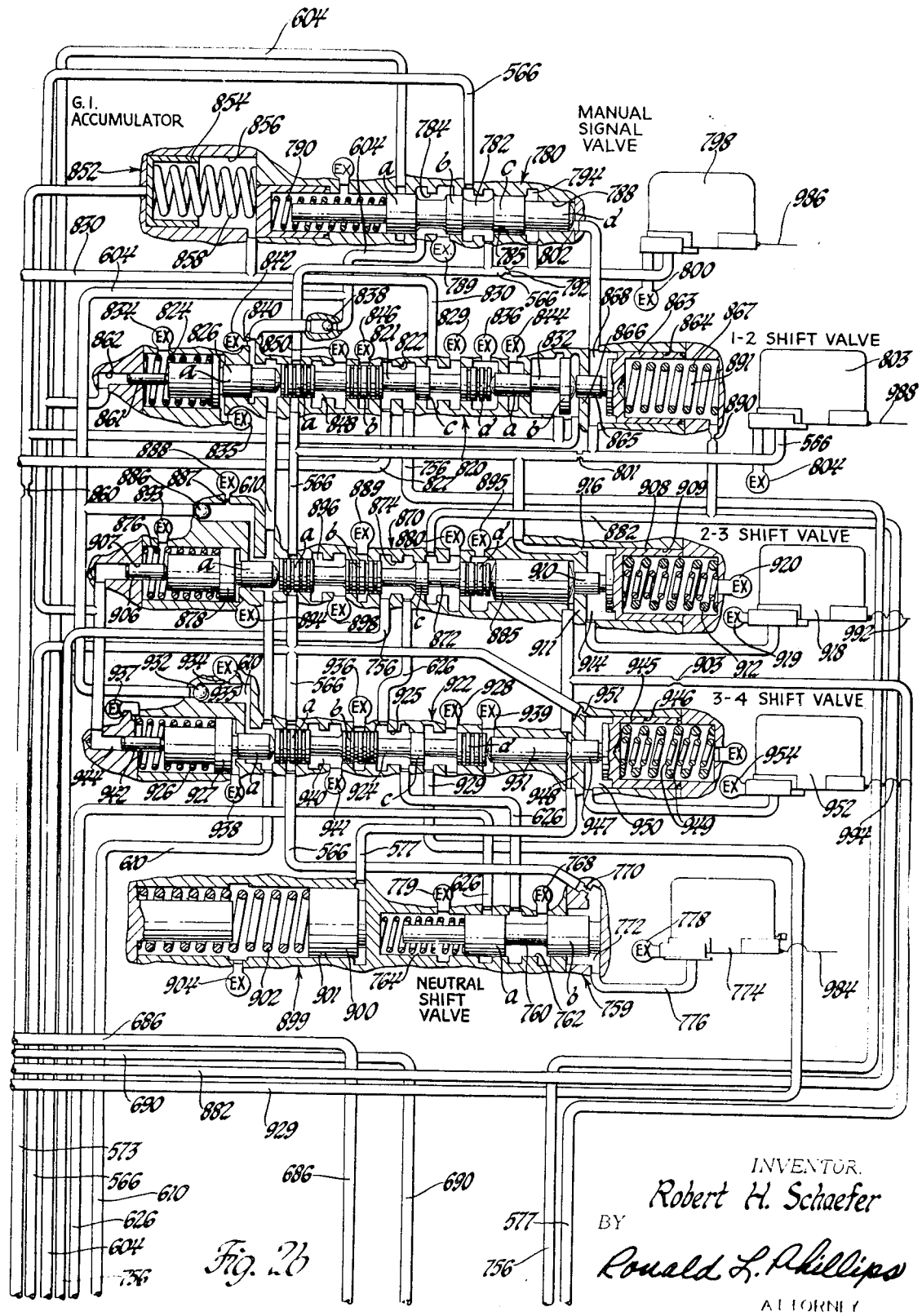

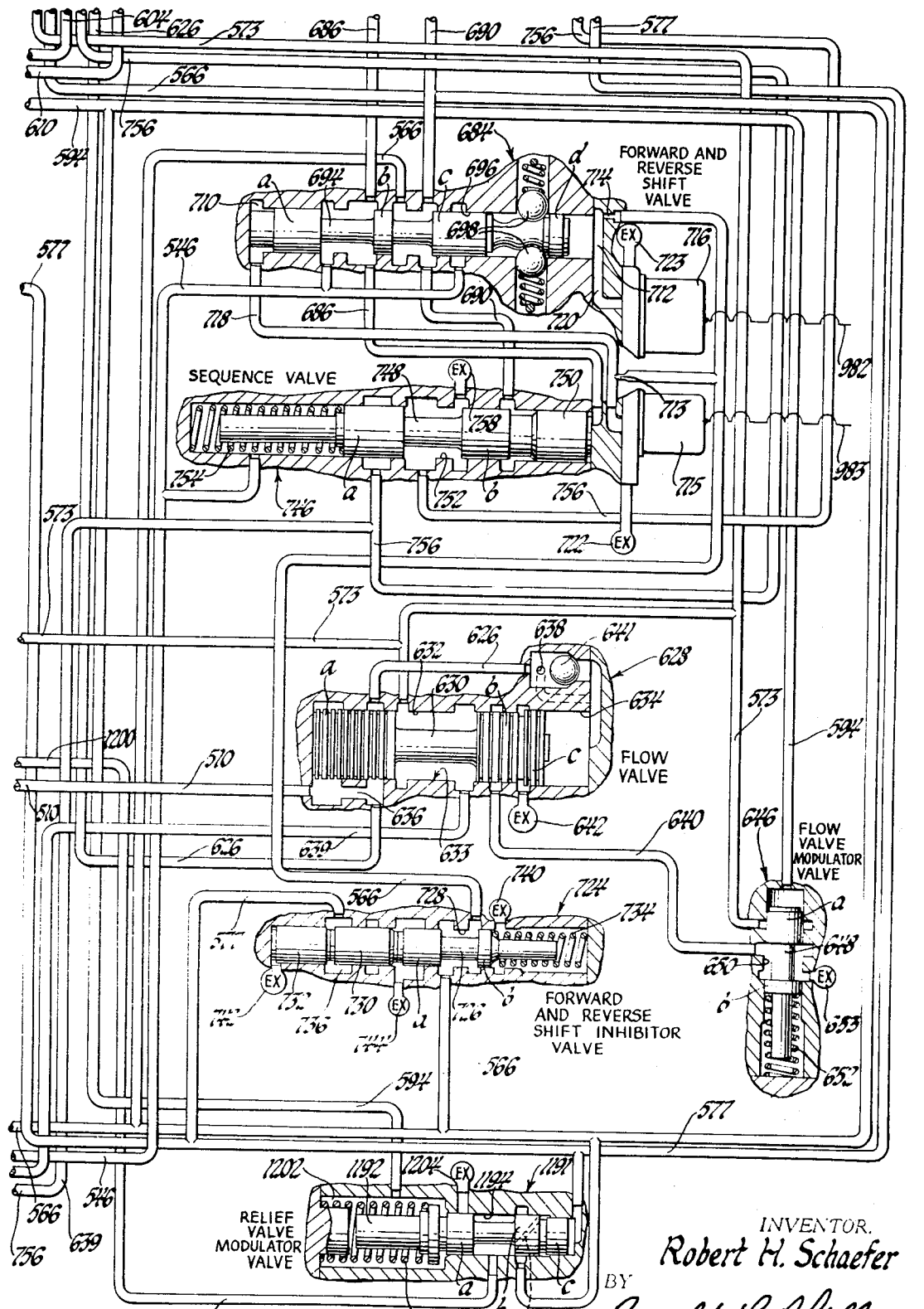

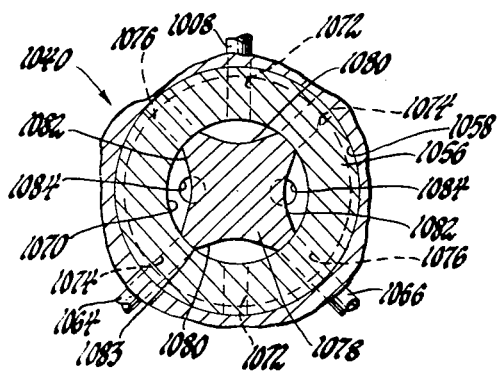
Fig. 3
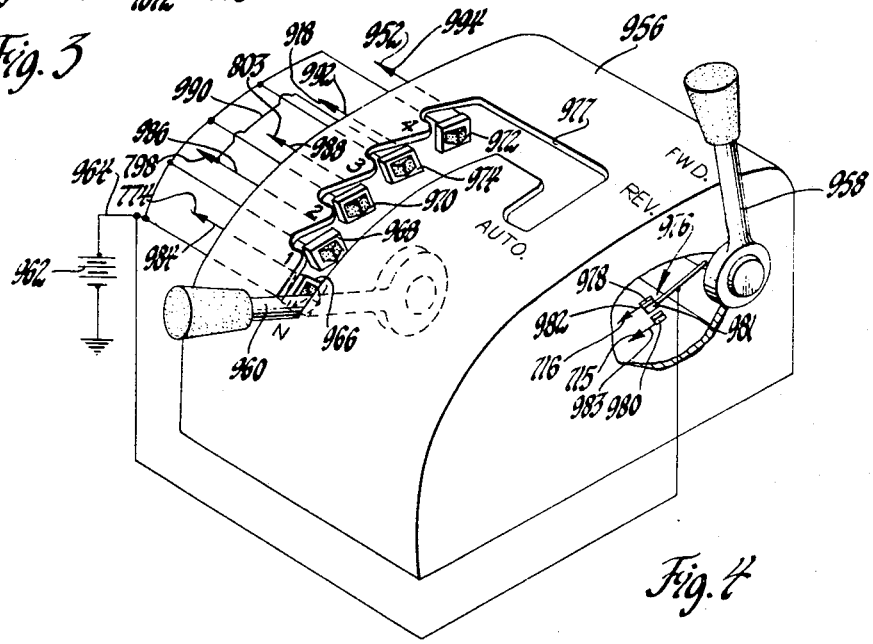
Fig. 4
| TRANSMISSION RANGE | | SOLENOID VALVE | | | | | | |
|---|---|---|---|---|---|---|---|---|
| | | 774 | 952 | 918 | 803 | 798 | 716 | 715 |
| F O R W A R D | AUTOMATIC | | | | | | X | |
| | 4 | | X | | | | X | |
| | 3 | | | X | | X | X | |
| | 2 | | | | X | | X | |
| | 1 | | | | | X | X | |
| | NEUTRAL | X | | | | | X | |
| R E V E R S E | AUTOMATIC | | | | | | | X |
| | 4 | | X | | | | | X |
| | 3 | | | X | | X | | X |
| | 2 | | | | X | | | X |
| | 1 | | | | | X | | X |
| | NEUTRAL | X | | | | | | X |
Fig. 5
INVENTOR.
Robert H. Schaefer
BY
Ronald L. Phillips
ATTORNEY

POWER TRAIN CONTROL SYSTEM

This application is a division of application Ser. No. 779,502, filed Nov. 27, 1968, now U.S. Pat. No. 3,640,157.

The invention herein described was made in the course of work under a contract or subcontract thereunder with the Department of Defense.

This invention relates to power train or transmission control systems and more particularly to a control system for a track-laying vehicle power train providing manual shift control, automatic shift control and steering control.

The control system according to the present invention may be employed in track-laying vehicle power trains or transmissions of the type shown in U.S. Pat. No. 3,373,636 issued Mar. 19, 1968, to Livezey et al. and entitled "VEHICLE TRANSMISSION INCLUDING STEERING BY DRIVING". The control system includes an upstream and a downstream main pressure regulator valve, the former regulating pressure at a value modulated according to both drive range and torque converter operation and used primarily for drive range engagement and converter lockup and the latter regulating pressure at an unmodulated value used primarily for directional drive engagement, control functions and as a source for control pressures. Two fluid velocity governors are provided, one producing a governor pressure (G1) proportional to converter turbine and power train output speed and the other producing a governor pressure (G2) which is zero throughout the lowest drive range and proportional to range unit and power train output speed in all of the higher drive ranges. A pair of throttle pressure regulator valves provide three control pressures, two of these control pressures (T and TV) derived by one valve from the unmodulated main pressure and the remaining control pressure (range TV) derived by the other valve from the unmodulated main pressure and TV pressure. The TV pressure is proportional to engine throttle opening, T pressure is the upper portion of the TV pressure range, and range TV pressure has a predetermined minimum value and is otherwise equivalent to TV pressure. A lockup valve under the control of implementing G1 pressure and inhibiting T and TV pressure determines converter lockup with a flow valve normally interrupting lockup during range shifting and a flow valve modulator valve under the control of TV pressure overriding the normal flow valve operation to permit maintenance of lockup with G1 pressure during range downshifting below a predetermined TV pressure or part engine throttle opening. A neutral shift valve under the control of a manually controlled solenoid valve determines the delivery of the modulated main pressure to series arranged range shift valves for drive range engagement.

The range shift valves operate to automatically shift between the drive ranges under the control of an upshift bias by G1 pressure for the lowest upshift, an upshift bias by G2 pressure for the higher upshifts, an upshift inhibiting bias by range TV pressure and a downstream bias by T pressure. The range shift valves under the control of manually controlled solenoid valves provide for manual range selection. For manual range selection, a manual signal valve under the control of manually controlled solenoid valves substitutes unmodulated main pressure for the T pressure downshift bias on the proper range shift valves to provide automatic downshifting from any higher drive range through any intermediate drive range to the manually selected drive range. This automatic downshifting with manual drive range selection is controlled to occur at a vehicle speed suitable for each lower drive range as determined by governor pressure bias, upshifts by manual selection occurring immediately.

A forward and reverse shift valve under the control of manually controlled solenoid valves determines the delivery of unmodulated main pressure for directional drive engagement in the selection being between forward and reverse drive. A forward and reverse inhibitor valve under the control of G2 pressure permits shifts between forward and reverse in the lowest drive range and prevents such shifting in all of the higher drive ranges. A sequence valve under the control of the operation of the forward and reverse shift valve effects disengagement of the drive to the load during a directional change in the lowest drive range to permit engagement of the directional drive under no-load conditions. An automatic shift inhibitor valve under the control of a steer signal pressure from the steer control inhibits automatic shifting during steering operation. There is also provided in the control system a converter pressure regulator valve which limits pressure to the torque converter, this pressure being modulated in accordance with converter operation, and an air valve which controls delivery of fluid to hydrodynamic and hydromechanical output brakes.

All of the solenoid valves are controlled by the operator from a selector box with a forward and reverse shift lever controlling solenoid valve operation for directional change and the remaining solenoid valves controlled by a manual and automatic shift lever for both manual drive selection and automatic range shifting. The solenoid valves are connected in the control system such that when they are all de-energized, the control system is conditioned for automatic range shifting in either drive direction, the forward and reverse shift valve being mechanically detented in each of its two drive determining positions. For automatic shifting operation, the forward and reverse shift lever is controlled by the operator to select the drive direction desired by energization of the proper direction control solenoid valve while the manual and automatic shift lever is operated to de-energize the remaining solenoid valves. Manual drive range selection is made by operating the manual and automatic shift lever to energize the proper solenoid valves to establish the desired drive range while the forward and reverse lever is operated to determine drive direction. Thus, with this arrangement and in the event there is an interruption in the electrical power while operating with manual drive selection, the control system will be automatically conditioned for automatic range shifting in the direction previously determined so that range shifting remains available.

The steer bias of the power train is effected by a converter pump driven hydrostatic unit, hydrostatic pump displacement being controlled by steer controls in the control system to control the steer bias. A manually controlled steer valve controls the delivery of a control pressure to vary hydrostatic pump displacement, the steer valve providing pump displacement in proportion to manual steer input. A centering and steer signal device accurately positions the steer valve for zero pump displacement and thus no steer bias when a steer is not being demanded and supplies the steer signal pressure to the automatic shift inhibitor valve for inhibiting automatic shifting during steering operation. A control pressure regulator valve always responsive to hydrostatic pump output pressure modulates the control pressure controlling pump displacement so that it increases with increasing hydrostatic pump output pressure and thus steer effort. An overload stroke limiter valve under the control of the pressure differential across the hydrostatic pump overrides steer control to prevent steer bias which would overload the hydrostatic pump. A relief valve is always connected to limit hydrostatic pump output pressure. The relief valve is under the control of a control pressure from a relief valve modulator valve which is controlled by range TV pressure and G2 pressure. In the lowest drive range the relief valve modulator valve control pressure to the relief valve controls maximum hydrostatic pump output pressure in accordance with range TV pressure to prevent pump overload and control pump power absorption to prevent engine stall. In all of the higher drive ranges the maximum hydrostatic pump output pressure in addition to the throttle pressure control is caused to decrease with increasing G2 pressure to prevent overloading the hydrostatic pump during demanded high speed turns.

An object of the present invention is to provide a new and improved power train control system.

Another object is to provide a new and improved power train control system providing both manual and automatic shifting.

Another object is to provide a power train control system having both a manual shift control and an automatic shift control wherein the automatic shift control remains available on discontinuance of power to the manual control.

Another object is to provide in a power train control system a torque converter lockup control for interrupting lockup during range shifting while holding lockup from zero to part engine throttle at low vehicle speeds.

Another object is to provide in a power train control system a sequence control to disengage a range drive on a directional change to permit directional drive engagement under no-load conditions.

Another object is to provide in a power train control system a manual shift control with automatic downshifting according to vehicle speed to a selected lower drive range.

Another object is to provide in a power train control system a directional drive inhibitor inhibiting directional changes in the power train's high drive ranges.

Another object is to provide in a power train range and steer control system a shift inhibitor inhibiting automatic shifting during steering operation.

Another object is to provide in a power train control system an unmodulated main pressure source for directional drive engagement, control functions and control pressures and a modulated main pressure source for drive range engagement and converter lockup.

Another object is to provide in a power train control system multiple throttle pressures for different control functions including converter lockup range shifting and hydrostatic pressure relief.

Another object is to provide in a hydrostatic steer control of a power train control system a control pressure regulator modulating control pressure for steer bias according to hydrostatic pump output pressure.

Another object is to provide in a hydrostatic steer control of a power train control system an overload stroke limiter limiting hydrostatic pump displacement in accordance with differential pressure across the hydrostatic pump.

Another object is to provide in a hydrostatic steer control of a power train control system a maximum hydrostatic pump output pressure relief in accordance with engine throttle opening and vehicle speed.

Another object is to provide in a power train control system electrically actuated manual drive selection and automatic drive selection independent of electrical power.

Another object is to provide in a power train control system an electrically actuated manual range selection and directional drive and a fluid pressure actuated automatic range control automatically actuated on discontinuance of electrical power for manual selection while directional drive selection is maintained.

These and other objects of the present invention will be more apparent from the following description and drawings in which:

The power train and control system are shown schematically in FIGS. 2a, 2b, 2c, 2d and 2e, when arranged as indicated by FIG. 1.

FIG. 3 is a view taken on the line 3—3 in FIG. 2d.

FIG. 4 is a perspective view with parts broken away of the operator's control in the power train control system.

FIG. 5 shows the schedule of power train operation.

POWER TRAIN ARRANGEMENT

Figure 2C:
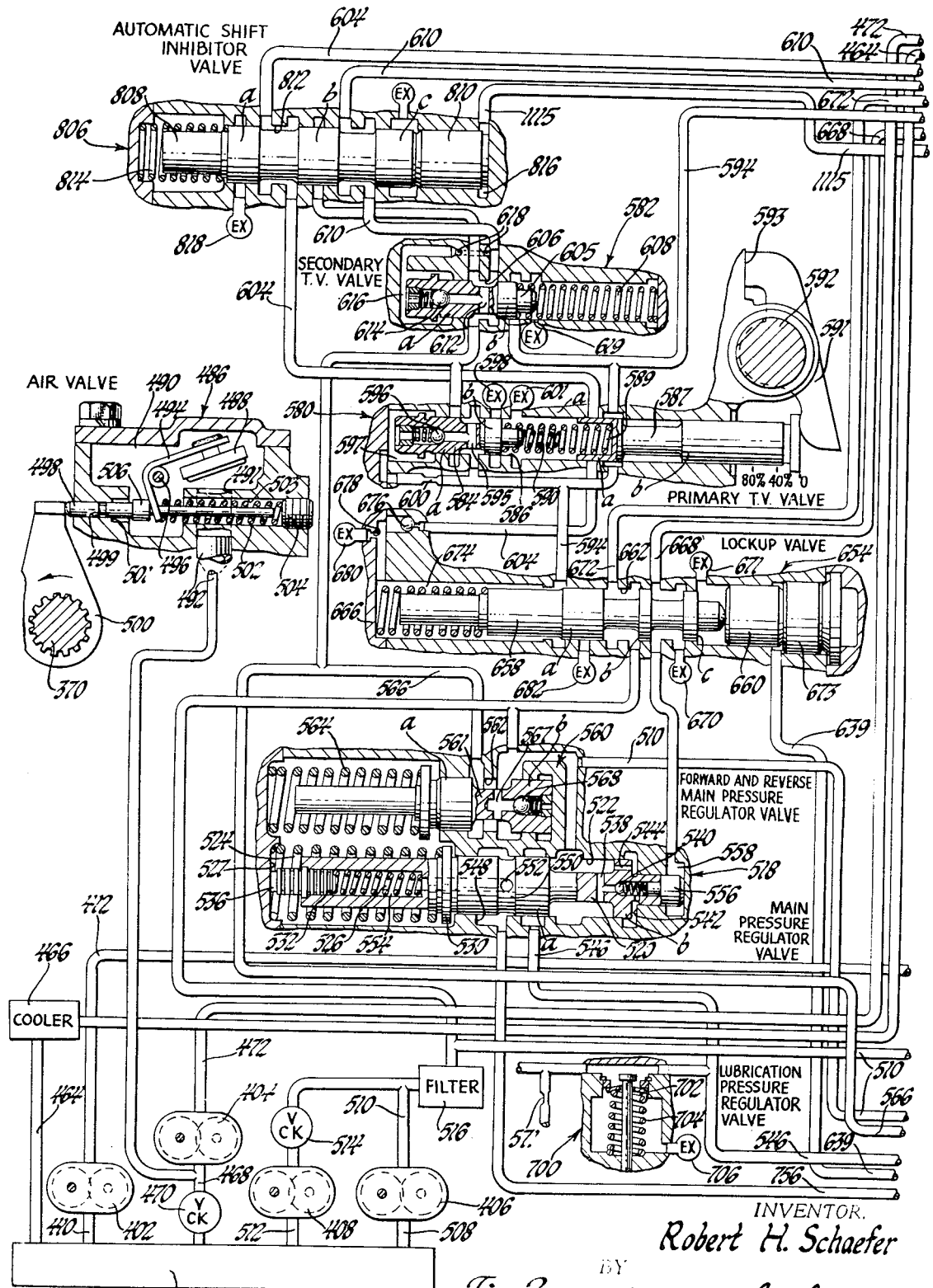

The invention is illustrated in an arrangement controlling a track-laying vehicle power train which is of the type shown in detail in the Livezey et al. U.S. Pat. No. 3,373,636 and is capable of providing multiple speed or drive range and hydrostatic steering operation in forward and reverse. The power train as shown in FIGS. 2a and 2d receives input from a prime mover 210 such as a piston engine and generally comprises a hydrodynamic torque converter 211, a forward and reverse drive unit 212, a three-speed planetary gear range unit 213, a left steer unit 214, a right steer unit 216, a differential unit 218, and a hydrostatic pump and motor steer unit 219 for controlling differential unit 218, all housed in a housing 222. These components are connected in the power train arrangement to provide four speed or drive ranges in forward and reverse and hydrostatically controlled steering.

In the power train arrangement, the engine 210 is connected to drive the power train's input shaft 224 which is connected by the converter's rotary housing 226 to pump blading 228 (P). The pump blading 228 exits fluid to turbine blading 229 (T) which is connected by hub 231 to converter output shaft 232. Fluid is redirected to pump blading 228 by stator blading 234 (S) which is grounded to the power train housing for reaction by one-way brake 236. A converter lockup clutch 238 connected between converter housing 226 and hub 231, when engaged, provides direct mechanical drive between power train input shaft 224 and converter output shaft 232.

The converter output shaft 232 provides input to both the range unit 213 and the differential unit 218 via the forward and reverse drive unit 212, the range unit 213 providing one input to each of the steer units 214 and 216 and the differential unit 218 providing another input to each of the steer units. In the drive to forward and reverse drive unit 212, the converter output shaft 232 is connected at its left end to a gear 239 meshing with an idler gear 240. Idler gear 240 meshes with a gear 241 which latter gear is connected to a shaft 242. Shaft 242 is connected to clutch drum 244 of the forward and reverse drive unit 212. Drum 244 is connectible through either a forward or reverse drive to both the range unit 213 and differential unit 218. For the forward drive units 213 and 218, unit 212 has a forward drive clutch 246 which, when engaged, connects drum 244 to a gear 247 geared to drive an annular gear 248. In this gear drive, gear 247 meshes as illustrated schematically by the dashed line with an idler gear 245 which latter gear meshes with the gear 248. Gear 248 is connected to a sleeve shaft 249 which is the input shaft of range unit 213. Gear 247 also meshes with an annular gear 250 which is connected to drum 251 of the differential unit 218, unit 218 being described in more detail later. Thus, in the forward drive gear train provided and with the forward drive clutch 246 engaged, shaft 242 drives the range unit input shaft 249 in the same direction and the differential drum 251 in the opposite direction.

For the reverse drive to the units 213 and 218, a reverse drive clutch 252 in unit 212 is engaged to connect drum 244 to an annular gear 254 freely received on shaft 242. Gear 254 meshes with an idler gear 256 which meshes with an annular gear 257. Gear 257 is connected by the differential drum 251 to the gear 250 at the other end of the drum. The drive is then from gear 250 via gears 247, 245 and 248 to the range unit input shaft 249. Thus, with the reverse drive clutch 252 engaged, shaft 242 drives the range unit input shaft 249 in the opposite direction and the differential drum 251 in the same direction.

In the range unit 213, its input shaft 249 is connected to both the annular sun gear 258 of a low ratio planetary gear set 259 and the annular sun gear 261 of an intermediate ratio planetary gear set 262. The sun gear 258 meshes with pinions 264 journaled on an output carrier 266. Ring gear 268 of the low ratio gear set meshes with pinions 264, is connected to carrier 269 of the intermediate ratio gear set, and may be held by a low brake 271 to provide a low ratio drive to output carrier 266. The sun gear 261 of the intermediate ratio gear set meshes with pinions 272 journaled on carrier 269. Ring gear 274 of the intermediate ratio gear set meshes with pinions 272 and may be held by an intermediate brake 276 to provide higher speed and intermediate ratio drive to output carrier 266. A high clutch 278, when engaged, connects the range unit input shaft 249 to the intermediate carrier 269 and connected low ring gear 268 to lock the low ratio gear set 259 to provide direct drive between the range unitt's input and output.

The range unit output carrier 266 is connected by a hub 279 to range unit output shaft 280 which extends freely through sleeve shaft 249, shaft 280 serving as both the range unit's output shaft and the steer units input shaft. Shaft 280 is connected at its left end to ring gear 281 of a planetary gear set 282 in left steer unit 214 and at its right end to ring gear 284 of a planetary gear set 286 in right steer unit 216, gear sets 282 and 286 having equal speed ratios.

On the left side, the ring gear 281 of gear set 282 meshes with pinions 287 journaled on an output carrier 288. An annular sun gear 290 freely received on shaft 280 meshes with pinions 287 and is connected to be controlled by the differential unit 218 as described in more detail later. A drum 291 connects carrier 288 to the power train's left output shaft 292 which shaft is for powering the vehicle's left track. A mechanical brake 299 and a hydrodynamic brake 300 are both connected to brake the power train's left output shaft 292.

On the right side, the ring gear 284 of gear set 286 meshes with pinions 301 journaled on an output carrier 302. A drum 303 connects carrier 302 to the power train's right output shaft 304 for powering the vehicle's right track. An annular sun gear 306 freely received on shaft 380 meshes with pinions 301 and is connected to be controlled by the differential unit 218. A mechanical brake 316 and a hydrodynamic brake 317 are both connected to brake the power train's right output shaft 304.

A low low brake 318, when engaged, is connected by the hub 279 to hold shaft 280 and the connected ring gears 281 and 284 of the steer units. This enables the sun gears 290 and 306 of the steer units to produce drive in the steer units without output from the range unit and at the lowest available ratio as described in more detail later.

Describing the hydrostatically controlled differential unit 218, the sun gears 290 and 306 of the steer units are continuously connected by equal speed ratio and direction reversing gear trains to output carriers 322 and 324 of equal speed ratio planetary gear sets 326 and 328, respectively, provided in unit 218. The left gear train comprises an annular gear 325 which is connected to sun gear 290 of the left steer unit and meshes with an annular gear 323. Gear 323 is connected by a sleeve shaft 327 to the left output carrier 322 of unit 218. The right gear train similarly comprises an annular gear 328 which is connected to sun gear 306 of the right steer unit and meshes with an annular gear 329. Gear 329 is connected by a sleeve shaft 330 to the right output carrier 324 of unit 218. The ring gears 331 and 332 of gear sets 326 and 328 are both connected to the drum 251 driven by the forward and reverse drive unit 212. Pinions 334 journaled on the left output carrier 322 mesh with the ring gear 331 and a sun gear 336. Similarly, pinions 338 journaled on the right output carrier 324 mesh with the ring gear 332 and an annular sun gear 339. The sun gears 336 and 339 mesh with meshing differential pinions 341 and 342, respectively. The differential pinions 341 and 342 are journaled on spindles attached to a differential carrier 344 which is continuously grounded to the power train housing by a shaft 346 which extends through annular sun gear 339.

Hydrostatic control of differential unit 218 is provided by the hydrostatic unit 219 shown in FIG. 2d operating on sun gear 336 of differential unit 218 which sun gear is connected by a shaft 349 to a gear 351, shaft 349 extending through sleeve shaft 327 to make the connection. Gear 351 meshes with a gear 352 which latter gear is connected by a motor output sleeve shaft 354 to the hydrostatic motor 356. The hydrostatic pump 358 is input driven through a gear train which has an annular gear 359 connected to the converter housing 226 and meshing with an idler gear 361. Gear 361 meshes with an annular gear 365 which is connected by a pump input sleeve shaft 367 to the hydrostatic pump 358, the input shaft 242 of the forward and reverse drive unit 212 extending freely through both shafts 367 and 354. Preferably, the hydrostatic pump 358 and hydrostatic motor 356 are axially aligned as one unit and located between the gears 365 and 352 with their central axis coinciding with that of the shaft 242 which then extends freely through the hydrostatic pump and motor steer unit. The pump 358 has a variable displacement and the motor 356 has a fixed displacement and the hydrostatic unit is conditionable to hold motor output shaft 354 and to drive the motor output shaft in either direction at infinitely variable speed.

The drive producing clutches and brakes are conventional friction drive establishing devices of the friction plate type each having a suitable fluid motor which is operated by fluid pressure to effect engagement of the device. Each of these devices also has suitable retraction spring means, not shown, that operate on exhaust of the fluid pressure to effect disengagement of the device. The output mechanical brakes 299 and 316 have conventional structure and are operated simultaneously by conventional linkage which includes a rotary or otherwise movable member such as shaft 370 shown in FIG. 2c which shaft turns during engagement and disengagement of these brakes.

OPERATION OF POWER TRAIN ARRANGEMENT

The power train may be operated to provide four speed or drive ranges in forward and reverse and hydrostatically controlled steering. The first (1) or low low drive range which is considered the lowest drive range and provides the greatest torque multiplication is established by engaging the forward drive clutch 246 in the case of forward drive and the low low brake 318 and conditioning the hydrostatic steer unit 219 to hold the motor output shaft 354 and thus the controlled sun gear 336 in differential unit 218, all other drive establishing devices being disengaged. Since the carrier 344 in the differential unit is grounded and the sun gear 336 is held by the hydrostatic steer unit, rotation of the other sun gear 339 is also prevented. With ring gears 331 and 332 of the differential unit being driven at the same speed and in the same direction by converter 211 through the forward drive clutch 246, the differential output carriers 322 and 324 are driven in the same direction at the same speed by locked drives. Thus, the sun gears 290 and 306 of steer units 214 and 216 are driven in the same direction which is forward and at the same speed while both of the ring gears 281 and 284 of the steer units are held by the low low brake 318. Therefore, the gear sets 282 and 286 in the steer units act as reduction gear sets with the locked input drives thus provided to drive the power train output shafts 292 and 304 in the forward direction at the same speed. When the speed of the converter turbine 229 reaches a desired value the lockup clutch 238 is engaged to provide mechanical drive instead of the hydraulic drive through the converter.

In the differential unit 218, rotation of sun gear 336 in either direction with the infinitely variable speed drive made available by the hydrostatic steer unit 219 results in opposite rotation of sun gear 339 at the same speed. Thus, the outputs carriers 322 and 324 and their gear train connected sun gears 290 and 306 of the steer units are driven at equal differential speeds measured from their same base speed with sun gear 336 held since the speed of these carriers is determined by the combination of the equal speed ratio drive to the connected ring gears 331 and 332 and the equal speed opposite directional drive to the sun gears 336 and 339.

Thus, for steering in the first forward drive range the hydrostatic steer unit 219 is conditioned so that instead of continuing to hold the differential unit's sun gear 336, it then drives the controlled sun gear 336 in either direction depending on the direction of vehicle turn desired. Then, with sun gear 336 rotating in one direction, the other differential sun gear 339 is caused to rotate in the opposite direction at the same speed. The combined differential action in the gear sets 326 and 328 that results causes, as for example when sun gear 336 is driven in the same direction as the ring gears 331 and 332, the carrier 322 to speed up by the same amount that the carrier 324 is being slowed down. In this manner the sun gears 290 and 302 in the steer units are differentially driven in the same direction or in opposite directions with locked differential drives, recognizing that the left sun gear 290, for example, will be speeded up by the same amount that the speed of the right sun gear 306 is diminished to thereby establish the differential steering. The steering radius is thus put under positive control and made infinitely variable by units 218 and 219 from straight ahead drive in the first drive range down to the minimum radius possible with gearing provided.

The three higher drive ranges (2, 3, 4) in the forward direction are established by driving the connected ring gears 281 and 284 in the steer units forward at different speeds with the forward clutch 246 remaining engaged, the sun gear 336 of the differential gear unit 218 held by the hydrostatic steer unit 219 and selective conditioning of the range unit 213 to provide its low ratio drive (low brake 271 engaged), intermediate ratio drive (intermediate brake 276 engaged), and high ratio drive (high clutch 278 engaged) in that order. In these three higher drive ranges, the steer units then act as power combining and speed differential devices receiving power from both the range unit 213 and the differential unit 218. Hydrostatically controlled differential steering is available in these higher ranges by control of the hydrostatic steer unit 219 to provide locked differential drive as described in the first drive range, recognizing that the speed added to one of the steer unit sun gears will be equal to the speed subtracted from the opposite steer unit sun gear while the connected ring gears of the steer units continue to rotate forwardly with their drive from range unit 213. Thus, the output speed in one steer unit is increased by the amount the output speed of the other steer gear unit is diminished to provide the differential steering. Again, the steer radius is under positive control and infinitely variable in the second, third and fourth forward drive ranges from straight ahead down to the minimum radius possible with the gearing provided.

Since the forward and reverse drive unit 212 provides the input to both the range unit 213 and differential unit 218, the same drive ranges and hydrostatically controlled differential steering provided in forward as described above, are also available in reverse by simply disengaging the forward drive clutch 246, engaging the reverse drive clutch 252 and operating range unit 213 and hydrostatic steer unit 219 as before.

For neutral, either the forward or reverse drive clutch is preferably engaged, all other drive establishing devices are disengaged, the sun gear 336 of the differential unit 218 is held by the hydrostatic steer unit 219 and there is no output drive to the power train output shafts 292 and 304. Steering in neutral is provided by controlling the hydrostatic steer unit 219 to drive the sun gear 336 in the differential unit 218 in either direction dependent on the direction of vehicle turn desired. This causes the opposite sun gear 339 of the differential gear unit to rotate in the opposite direction at the same speed and since the drum 251 is acted on by opposed gear forces, the connected ring gears 331 and 332, though free, provide reaction in their gear sets. Thus, the output carriers 322 and 324 of the differential unit are caused to rotate at equal speeds in opposite directions. Because the sun gears 290 and 306 of the steer units are being driven in opposite directions and at the same speed by the free differential drives provided by unit 218, the connected ring gears 281 and 284 of the steer units, though free, provide reaction resulting in the power train output shafts 292 and 304 being driven at equal speeds in opposite directions to produce pivot steering.

CONTROL SYSTEM

The control system for this power train arrangement and according to the present invention provides for both automatic and manual selection of the four drive ranges in both forward and reverse and steering control in all drive ranges and neutral. Other functions of the control system include lubrication, cooling, charging of the torque converter, and charging of the hydrodynamic brakes.

FLUID SUPPLY

Figure 2D:
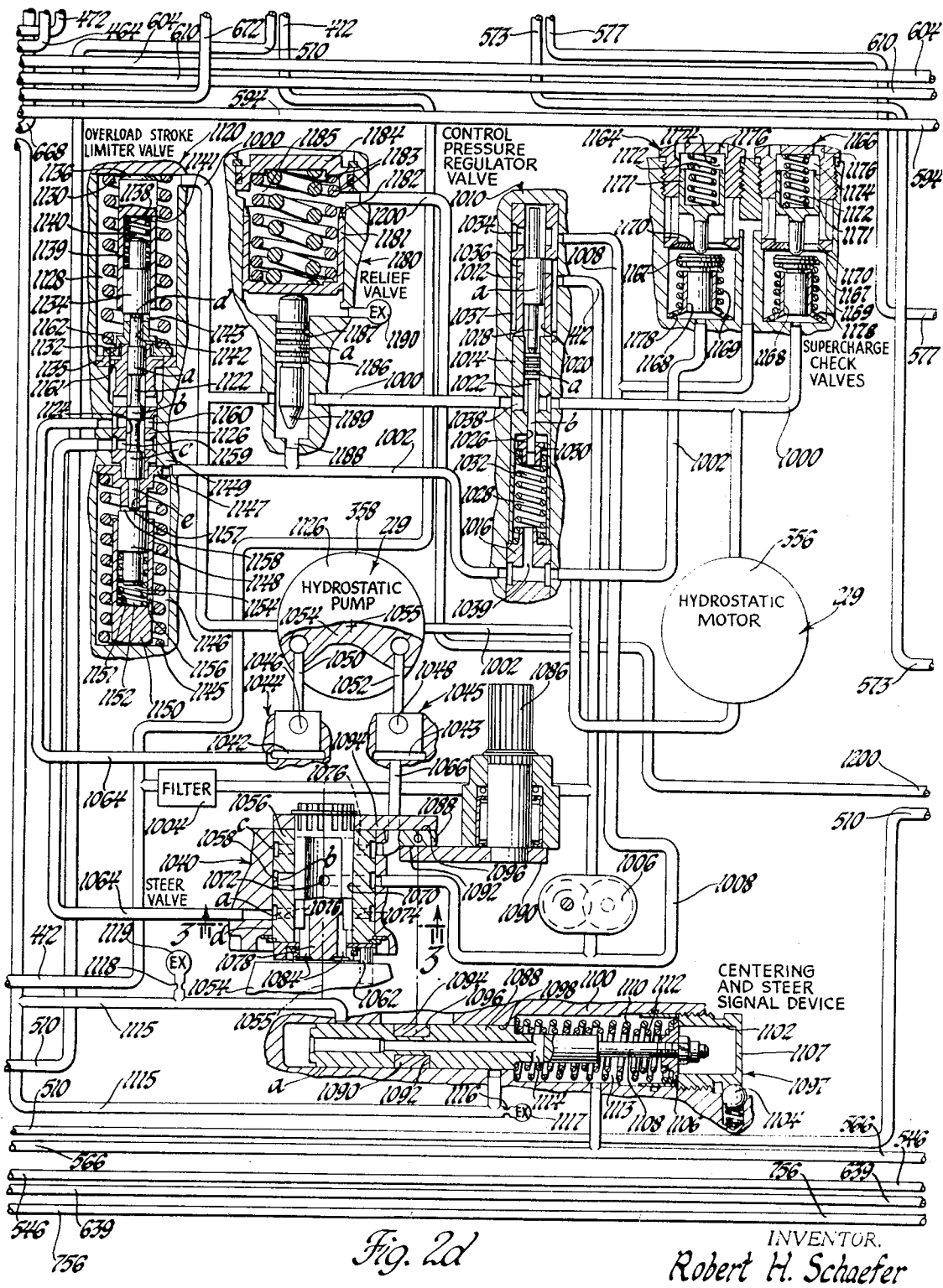

The fluid such as oil used in all of the control functions is supplied by four gear-type positive displacement pumps shown in FIG. 2c which draw from a reservoir 400 to which the fluid exhaust from all parts of the system is returned. Fluid which tends to accumulate in certain locations in the power train housing 222 is scavenged by one or more input driven scavenge pumps, not shown, which remove this excess fluid and return it to the reservoir.

The pump 402, which is called the hydrostatic supercharge-converter pump, is drivingly connected to the power train input shaft 224 so that it is continuously driven to supply fluid when the engine is operating. This pump supplies both the hydrostatic steer portion and the torque converter portion of the system.

The pump 404, which is called the coolant pump, is drivingly connected to the converter turbine 229 so that it is driven to supply fluid when the converter turbine is being driven. The fluid supplied by this pump is delivered to charge the hydrodynamic output brakes 300 and 317 with this same fluid then being used to flood the friction plates of the mechanical output brakes 299 and 316 to cool them during their engagement.

The pump 406, which is called the main pressure input pump, is drivingly connected to the power train input shaft 224 so that it is continuously driven to supply fluid when the engine is operating. The fluid supplied by this pump furnishes the main fluid supply to the shift control portion of the control system which controls the shifting of the power train and also delivers fluid to lubricate various parts of the power train.

The pump 408, which is called the main pressure output pump, is drivingly connected to one of the power train output shafts, output shaft 292 for example, so that it is driven to supply fluid only when the vehicle is moving forwardly. The fluid supplied by this pump supplements the fluid supply from the main pressure input pump 406 during forward drive operation and is the only source of main pressure supply when the main pressure input pump is not operating.

HYDROSTATIC SUPERCHARGE PRESSURE REGULATOR VALVE

The hydrostatic supercharge-converter pump 402 draws fluid from the reservoir 400 via intake line 410 and delivers this fluid to a hydrostatic supercharge-converter supply line 412. Line 412 as shown in FIG. 2a is connected to a chamber 414 in one end of the valve body of a hydrostatic supercharge pressure regulator valve 416 which in addition to providing a regulated low pressure source for the hydrostatic portion of the control system admits fluid to the torque converter 211. Regulator valve 416 has a regulator valve element 418 with a land $a$ located in bore 420 of a sleeve 422 secured in the valve body. A valve stem 424 bottomed on a retaining ring 426 has a land $a$ located in a blind bore 428 in the lower end of regulator valve element 418 to provide a damping chamber 430. Chamber 430 is continuously connected by an orifice 432 and an elongated annular channel 433 in regulator valve element 418 to the control system's main line which has fluid at main pressure as described in more detail later.

The force of a spring 434 arranged between the regulator valve element 418 and the base of the valve stem 424 plus the main pressure in damping chamber 430 urge the regulator valve element 418 upward toward closed position shown, the closed position determined by shoulder 436 of valve element 418 abutting collar 438 of sleeve 422. The regulator valve element 418 in its closed position closes a converter-in line 440 from the hydrostatic supercharge-converter supply line 412. These forces are opposed by the pressure from line 412 acting on the full upper end area of land $a$ of regulator valve element 418 which urges the regulator valve element downward toward an open position connecting line 412 to the converter-in line 440 through porting 441 in sleeve 422. The spring bias of the regulating spring 434 plus the pressure bias in chamber 430 provide for regulation of pressure (hydrostatic supercharge pressure) in line 412 to the desired value with the overage delivered to the converter-in line 440. The damping chamber 430 with its restricted connection by orifice 432 to the control system's main line prevents the shoulder 436 from battering the collar 438 during the pressure regulation.

CONVERTER PRESSURE REGULATOR VALVE

The pressure of the fluid admitted by the hydrostatic supercharge pressure regulator valve 416 to the converter-in line 440 is reduced to either one of the two lower regulated pressures by a converter pressure regulator valve 442 shown in FIG. 2a. The high regulated pressure provided by the converter pressure regulator valve 442 is for normal converter operation and the low regulated pressure is for lockup operation with the lockup clutch 238 engaged. The converter-in line 440 is connected to a chamber 444 in the upper end of the valve body of regulator valve 442 which has a regulator valve element 446 guided by a rod 448 extending through central bore 450 in the valve element. The rod 448 is secured at its lower end to a plug 452 located in bore 454 of the valve body, plug 452 in cooperation with bore 454 providing a chamber 456. A spring 458 arranged between the regulator valve element 446 and plug 452 urges the regulator valve element upward toward the closed position shown. The regulator valve element 446 in its closed position closes the chamber 444 and connected converter-in line 440 from an exhaust 460. The closing force is opposed by pressure from the converter-in line 440 acting in chamber 444 on the regulator valve element 446, this pressure urging the regulator valve element downward toward an open position connecting the chamber 444 to exhaust 460. The low regulated pressure is provided when the chamber 456 is exhausted and the plug 452 is bottomed so that the normal bias of regulating spring 458 determines the opening and closing of the valve.

The high regulated pressure by converter pressure regulator valve 442 is provided when a pressure signal is delivered to the chamber 456 from the lockup shift control portion of the control system as described in more detail later. The pressure delivered to chamber 456 raises the plug 452 upward to the position shown in which it abuts with a stop ring 461 thereby increasing the bias applied by spring 458 to the regulator valve element 446 to effect the high pressure regulation. An elongated external annular channel 462 in the plug 452 is supplied with fluid from the control system's main line described later so that the plug floats on a constant film of fluid allowing it to move readily between its low and high pressure positions.

The fluid at pressure regulated by the converter pressure regulator valve 442 is delivered by the converter-in line 440 to the torque converter 211. The fluid leaves the converter by a converter-out line 464 which passes it through a cooler 466 located externally of the power train housing prior to returning it to the reservoir 400, the restriction to flow through the converter-out line 464 and cooler 466 maintaining pressure at the converter outlet.

The capacity of the hydrostatic supercharge-converter pump 402 is sufficient to meet the requirements of both the hydrostatic portion of the control system and the torque converter during all their operating conditions, the high charging pressure for converter operation maintaining the converter filled with fluid while effecting sufficient flow to carry away heat for dissipation in the cooler. During lockup operation, the converter requires a smaller volume of fluid which is effected by the low regulated pressure provided by the converter pressure regulator valve 442.

HYDRODYNAMIC BRAKES

The coolant pump 404 is operable to draw fluid from the reservoir 400 via an intake line 468 through a check valve 470 and deliver the fluid to a coolant line 472 as shown in FIG. 2c. Coolant line 472 is connected to cavities 474 and 476 of the hydrodynamic brakes 300 and 317, respectively, as shown in FIG. 2a. With rotors 478 and 480 of the hydrodynamic brakes 300 and 317, respectively, rotating through their fluid-filled cavity, there is provided hydrodynamic braking of the power train output shafts. When pump 404 is operating the fluid continuously passes through the cavities 474 and 476 and is directed by mechanical brake coolant lines 482 and 484 to cool the friction plates of the mechanical output brakes 299 and 316, respectively.

AIR VALVE

Control over delivery of fluid by the coolant pump 404 to the hydrodynamic and mechanical output brakes is provided by an air valve 486 shown in FIG. 2c. Air valve 486 has a valve element 488 which in the open position shown opens chamber 490 in the valve body via a port 491 to an air line 492, chamber 490 being open to atmosphere. Air line 492 is connected to the intake side of the coolant pump 404 upstream of check valve 470. Thus, when the coolant pump is being driven with the air valve 486 open, the check valve 470 closes and the coolant pump is air bled and delivers only air to the cavities of the hydrodynamic and mechanical output brakes thereby belljarring these cavities to force any fluid therein back to the reservoir. When the air valve element 488 is moved to a closed position closing port 491 and thus closing the air line 492 to the atmospheric chamber 490, air is prevented from entering the intake side of the coolant pump which then operates to draw fluid through the check valve 470 for delivery to the brakes.

The opening and closing of the air valve 486 is under the control of the mechanical linkage which operates the mechanical output brakes 299 and 316. The valve element 488 is secured to the upper end of a right-angle arm 494 which is pivoted at its bend on a pivot pin 496 secured in the valve body. The lower end of arm 494 has an aperture through which a control rod 498 extends, the rod being mounted for reciprocal movement in stepped bore 499 in the valve body. When the mechanical output brakes are disengaged, shaft 370 of their linkage is in the angular position shown in FIG. 2c. An arm 500 splined to shaft 370 engages the projecting left end of control rod 498 so that while the mechanical output brakes are disengaged, a spring 502 mounted in a bore 503 in the valve body and between a screw plug 504 and the lower end of arm 494 holds the latter against a collar 506 on the control rod 498. This positions and holds the valve element 498 in its open position so that the coolant pump 404 is air bled when the mechanical output brakes are disengaged. When the mechanical output brakes are engaged by the operator, shaft 370 is pivoted counterclockwise as shown by the directional arrow. This swings arm 500 counterclockwise and the spring 502 forces the control rod 498 to follow arm 500 while forcing the lower end of arm 494 to follow the collar 506 and swing valve element 488 to its closed position, the collar 506 abutting shoulder 501 in bore 499 to limit the leftward movement of the control rod. With the air valve 486 closed the coolant pump 404 is no longer air bled and then delivers fluid to the brakes as previously described. The motion of the mechanical linkage operating the mechanical brakes is such that the air valve 486 closes prior to initial engagement of the mechanical output brakes so that the hydrodynamic brakes are put in operation first to retard the vehicle.

MAIN PRESSURE REGULATOR VALVE

The main pressure input pump 406 draws fluid from the reservoir 400 via intake line 508 and delivers this fluid to a main line 510. The main pressure output pump 408 draws fluid from the reservoir via an intake line 512 and delivers this fluid through a check valve 514 to main line 510. The fluid delivered to main line 510 from these pumps is passed through a filter 516 prior to flowing to all downstream portions of the control system.

The main pressure supply for the shift control portion of the control system is regulated in main line 510 by a main pressure regulator valve 518 shown in FIG. 2c, the valve delivering the excess fluid to lubricate parts of the power train. The main pressure regulator valve 518 has a regulator valve element 520 having lands $a$ and $b$ of equal diameter located in bore 522 of the valve body. Regulator valve element 520 is normally biased to the right to the position shown by two springs 524 and 526. The spring 524 is located between left end wall 527 of the valve body and a shoulder 530 on the regulator valve element 520. The spring 526 is located in a blind bore 532 in the left end of the regulator valve element 520 and between the regulator valve element and a plug 536 which is bottomed at its left end on the valve body wall 527, the regulator valve element being movable with respect to plug 536. The main line 510 is always connected to the bore 522 in the space between lands $a$ and $b$. This space is always connected to a passage 538 in regulator valve element 520 having a spring loaded ball check valve 540 therein permitting fluid flow from the main line 510 to the bore 522 between land b and right end wall 542 of the valve body. The fluid admitted to the right end of the valve bore 522 acts on the exposed and area of land $b$ so that the valve regulates the pressure in main line 510 with the normal action of the regulating springs 524 and 526. The check valve 540 in cooperation with an orifice 544 through land $b$ damps the action of the regulator valve. The fluid overage resulting from the regulating action upon leftward regulator valve element movement to maintain the main line pressure is delivered to a lubrication line 546.

The action of regulating springs 524 and 526 with no assist establishes a low main pressure in main line 510. This low main pressure is used when the control system is controlling third and fourth drive range operations in either forward or reverse and neutral. When the power train is operating in the first and second drive ranges in either forward or reverse, the regulating springs are assisted by fluid pressure to boost main line pressure to a higher regulated value. The regulated high main pressure is provided by directing a signal pressure indicating first and second drive range operation to a port 548 in the valve body which is continuously connected by a channel 550 in land $a$ of the regulator valve element 520 and a passage 552 to chamber 554 in the left end of the regulator valve element, such chamber being provided by the bore 532 and plug 536. The fluid pressure thus delivered to the chamber 554 acts leftward on the bottomed plug 536 and rightward on the regulator valve element 520 thereby assisting the regulating springs and boosting the regulated pressure in main line 510 to the higher value.

The main pressure, when it is at either its low or high value, is decreased during converter lockup operation. This is permissable since lower torque at higher rotating speeds is being transmitted through the power train. To this end, the regulator valve element 520 has a reduced diameter portion 556 which extends through an aperture in the end wall 542 of the valve body into a chamber 558. When fluid pressure indicating lockup operation is delivered to the chamber 558 as described in more detail later, such pressure acts leftward on the regulator valve element 520 to decrease main line pressure.

The main line 510 is connected to the damping chamber 430 of the hydrostatic supercharge pressure regulator valve 416 and channel 462 of the converter pressure regulator valve 442. Thus, fluid at the main pressure is supplied to these valves for their operations as previously described.

FORWARD AND REVERSE MAIN PRESSURE REGULATOR VALVE

Main line 510 is also connected to a forward and reverse main pressure regulator valve 560 which is shown in FIG. 2c. Valve 560 has a regulator valve element 561 with lands $a$ and $b$ of equal diameter located in bore 562 of the valve body. The valve element 561 is normally biased to the open position shown by spring 564. A forward and reverse main line 566 is always connected to a passage 567 in the valve element having a spring loaded ball check valve 568 therein permitting fluid flow from the forward and reverse main line 566 to the right end of the valve bore 562. The fluid in the right end of the valve bore acts leftward on the full end area of land $b$ to close the connection to main line 510 so that the valve regulates the pressure in the forward and reverse main line 566 even though main pressure is subject to modulation which gives several pressure levels as previously described. The check valve 568 in cooperation with a small clearance between land $b$ and the bore 562 damps the action of the regulator valve.

GOVERNORS

The control system has two fluid velocity governors providing separate speed governed pressures. These pressures are used to control different operations in the control system.

One governor 569 called the G1 governor is shown in FIG. 2a and has an annular trough 570 connected to the power train shaft 242 which is driven by the converter turbine 229. The annular trough 570 is maintained suitably filled with fluid from the lubrication line 546 via orifice 571 shown in FIG. 2c. This fluid impinges on the open end of a pitot tube 572 to provide in a G1 line 573 a governor pressure (G1 pressure) which is proportional to converter turbine speed.

The other governor 574 called the G2 governor is also shown in FIG. 2a and has its annular trough 575 connected to the range unit output shaft 280. The trough 575 is maintained suitably filled with fluid from the lubrication line 546 via orifice 571 like the G1 governor 569. This fluid impinges on either open end of a double ended pitot tube 576 having a two way check valve between the open ends to provide in a G2 line 577 a governor pressure (G2 pressure) which is proportional to vehicle speed in second, third and fourth drive range operations in forward and reverse, the range unit output shaft 280 being stationary in the first drive range in forward and reverse.

PRIMARY THROTTLE PRESSURE REGULATOR VALVE AND SECONDARY THROTTLE PRESSURE REGULATOR VALVE

Three pressures indicating engine torque demand and used primarily for control of various automatic operations in the control system are provided. These are T pressure, TV pressure and range TV pressure. The T and TV pressures are derived from forward and reverse main pressure in the line 566 by a primary throttle pressure regulator valve 580 (primary TV valve) and the range TV pressure is derived from forward and reverse main pressure in line 566 by a secondary throttle pressure regulator valve 582 (secondary TV valve), both of these valves being shown in FIG. 2c.

The primary TV valve 580 has a regulator valve element 584 having lands a and b of equal diameter located in a small diameter portion of a bore 586 in the valve body. The valve also has a control valve element 587 having lands a and b of equal diameter and larger in diameter than the lands of valve element 584 located in a large diameter portion of bore 586. A zero or closed throttle to full throttle regulating spring 589 and a detent spring 590 of shorter length are located between the two valve elements 584 and 587.

The positioning of the control valve element 587 is controlled by a throttle cam 591 which contacts the projecting right end of the control valve element 587 and is pivoted by pivot pin 592 on the valve body, the throttle cam 591 being connected by suitable linkage to the engine throttle control, not shown, which controls the throttling of the engine 210. When the engine throttle is closed or at zero throttle position, the cam 591 is against a stop 593 and the two valve elements 584 and 587 are positioned as shown with the outer spring 589 positioning the control valve element 587 against the cam 591. At the zero position of the control valve element 587 which corresponds to closed engine throttle, there is no spring loading on the regulator valve element 584 and its land a blocks the forward and reverse main line 566 so that a TV line 594 receives no pressure, TV line 594 being continuously connected to the space between lands a and b of the regulator valve element. As the engine throttle is opened, the cam 591 is pivoted clockwise moving the control valve element 587 leftward. This leftward movement causes the spring 589 to load the regulator valve element 584 and opens the forward and reverse main line 566 so that fluid is delivered between lands a and b of the regulator valve element to the TV line 594. The TV line 594 is always connected to a passage 595 in the regulator valve element 584 having a spring loaded ball check valve 596 therein permitting fluid flow from the TV line 594 to chamber 597 at the left end of the valve body. The fluid pressure in chamber 597 acts rightward on the full end area of land a so that the valve regulates to provide TV pressure in the TV line 594 according to the acting spring bias of regulating spring 589 with overage being delivered to an exhaust 598. The TV line 594 is also connected to the chamber 597 through an orifice 600 so that the ball check valve 596 in cooperation with the orifice 600 damps the regulating action of the valve. An exhaust 601 exhausts any leakage that otherwise might collect in bore 586 between valve elements 584 and 587.

Since movement of the valve element 587 is proportional to the engine throttle opening which is indicative of engine torque demand, the spring load thus provided on the regulator valve element 584 is also proportional to engine throttle opening and indicative of engine torque demand. Thus, the TV pressure produce in TV line 594 is proportional to engine throttle opening and increases with increasing throttle opening and torque demand.

The control valve element 587 at a point corresponding to full engine throttle opening and near the element's limit of leftward travel, 80% for example, begins pressing the detent spring 590. Thus, leftward movement of control valve element 587 past 80 percent travel causes the detent spring 590 to load the regulator valve element 584 in addition to the spring bias of spring 589 while the linkage to the engine throttle passes through a detent. Thus, through detent past full engine throttle, TV pressure increases rapidly at an increased rate to its maximum.

The TV line 594 is always connected at bore 586 around the control valve element 587 and through the valve body as shown. The control valve element 587 at a point about midway through its maximum travel, 40 percent for example, connects the TV line 594 between the elements lands a and b to a T line 604 and throughout the remainder of leftward movement of the control valve element. The TV pressure delivered to the T line 604 provides the T pressure which is thus the upper part of the range of TV pressure in TV line 594.

The secondary TV valve 582 has a regulator valve element 605 with equal diameter lands a and b located in a bore 606 of the valve body. A regulator spring 608 biases the regulator valve element 605 leftward to connect the forward and reverse main line 566 via the space between lands a and b to a range TV line 610 which is always connected to this space. This space is always connected to a passage 612 in the regulator valve element having a spring loaded ball check valve 614 therein permitting flow from the range TV line 610 to a chamber 616 at the left end of the valve body. The fluid pressure in chamber 616 acts on the full end area of land a to urge the regulator valve element 605 rightward against the spring bias. With rightward movement of regulator valve element 605, land a closes the connection to the forward and reverse main line 566 and opens the range TV line 610 between lands a and b to the TV line 594. The range TV line 610 is connected through an orifice 618 to chamber 616 so that the orifice and check valve 614 cooperatively provide for damping regulator valve element movement during pressure regulation. An orifice 619 exhausts any leakage that might otherwise collect in the right end of bore 606.

The secondary TV valve 582 regulates to provide minimum range TV pressure in range TV line 610 according to the bias of regulator spring 608 as long as overage can exhaust the the TV line 594, i.e., range TV pressure is greater than TV pressure. When TV pressure is equal to or greater than the minimum range TV pressure determined by the regulator spring 608, overage exhaust is prevented by TV pressure. TV pressure is then transmitted from the lockup TV line 594 to the range TV line 610 by what was before the regulator exhaust connection of the secondary TV valve 582. The TV pressure in the range TV line 610 is transmitted to chamber 616 where it acts to hold the regulator valve element 605 in what would normally be its exhaust position so that the TV pressure connection is maintained when TV pressure is equal to or greater than the minimum range TV pressure.

Thus, the minimum range TV pressure in line 610 is provided by regulating action of the secondary TV valve 582. Higher range TV pressure in line 610 is provided by TV pressure through the valve upon cessation of its regulating action when TV pressure is equal to or greater than the minimum range TV pressure.

FLOW VALVE

The main line 510 is connected to a range main line 626 by a flow valve 628 shown in FIG. 2e. Flow valve 628 has a valve element 630 having lands a and b of equal diameter located in portion 632 of a stepped bore 633 in the valve body and a land c of larger diameter located in bore portion 634. Main line 510 is connected to the left end of bore 633 to act rightward on the full end area of land a and is connected to the range main line 626 via an orifice 636 in the valve body. The range main line 626 is connected via an orifice 638 to the right end of bore 633 where it acts leftward on the full end area of the larger land c.

When there is no flow from main line 510 to range main line 626 through orifice 636, the pressures on the opposite ends of the flow valve element 630 are equal and the pressure on the larger land c holds the valve in the no-flow position shown. In the no-flow position the valve element 630 connects the G1 line 573 between lands a and b to a G1-lockup line 639 and land b blocks a G1-exhaust line 640 from the space between lands a and b.

When there is flow, which occurs during a range shift, the pressure drop which results at the orifice 636 reduces pressure in the range main line 626 and thus the pressure acting on the larger land c. This pressure reduction is sufficient to cause the valve element 630 to move rightward to a lockup cutoff or flow position. Rapid rightward movement of the flow valve element 630 is permitted by a ball check valve 641 which unseats to permit flow from the right end of bore 633 to the range main line 626. In the lockup cutoff position, land a of valve element 630 blocks the G1 line 573 and the G1 lockup line 639 is connected between lands a and b to the G1 exhaust line 640.

After the range shift is made, pressure increases in the range main line 626 until the pressures at each side of the flow valve orifice 636 are again equal. When this occurs, the check valve 641 closes and fluid flows back into the right end of bore 633 through the orifice 638 which bypasses the check valve 641. The return flow through orifice 638 is slower than the flow through the check valve 641 and thus the leftward movement of the flow valve element 630 that results is slower than the rightward movement. An exhaust 642 connected at the step in bore 630 between lands b and c prevents hydraulic locking of valve element 630.

FLOW VALVE MODULATOR VALVE

A flow valve modulator valve 646 shown in FIG. 2e provides for normal operation of the flow valve 628 to control connection of the G1-lockup line 639 between the G1 line 573 and exhaust above a predetermined part engine throttle opening on a range shift and bypasses the normal action of the flow valve 628 below this engine throttle opening so that the G1 line 573 and G1-lockup line 639 remain connected on a range shift. The flow valve modulator valve 646 has a valve element 648 having lands a and b located in a bore 650 of the valve body. The valve element 648 is biased upward by a spring 652 to a bypass position connecting the G1 line 573 between lands a and b to the G1-exhaust line 640. Thus, when the flow valve 628 is in its lockup cutoff position and the flow valve modulator valve 646 is in its bypass position, the G1 line 573 remains connected to the G1-lockup line 639.

The TV line 594 is connected to the upper end of bore 650 so that TV pressure acts downward on the full end area of land a of the valve element 648 against the spring bias. The TV pressure above a predetermined part engine throttle opening prevails over the spring bias and moves the valve element 648 to the exhaust position shown connecting the G1 exhaust line 640 between lands a and b to an exhaust 653 while land a blocks the G1 line 573. Thus, when the flow valve 638 is in its lockup cutoff position and the flow valve modulator valve 646 is in its exhaust position the G1-lockup line 639 is disconnected from the G1 line 573 and connected to exhaust 653.

LOCKUP VALVE

A lockup valve 654 shown in FIG. 2c controls the delivery of main pressure in main line 510 to a lockup clutch motor 656 shown in FIG. 2a which operates the converter lockup clutch 238. The lockup valve 654 has a valve element 658 having lands a, b and c of equal diameter and a G1 plug 660 of larger diameter located in a stepped bore 662 in the valve body. A spring 666 located in the left end of the bore urges the shift valve element 658 and the G1 plug 660 to the position shown which is the release position. In this position a lockup clutch line 668 connected to both the lockup clutch motor 656 and the chamber 558 of the main pressure regulator valve 518 is exhausted between lands b and c to exhaust 670. Thus, the lockup clutch 238 is released and main pressure is regulated at its low value by the main pressure regulator valve 518. In addition, the lockup valve 654 when in the release position connects main line 510 between the lands *a* and *b* to a converter signal line 672 which is connected to chamber 456 of the converter pressure regulator valve 442. Thus, converter-in pressure is regulated at its high value by the converter pressure regulator valve 442 for normal converter operation with the lockup clutch released.

The lockup valve element 658 is biased to the left to an apply or lockup position by G1 pressure under the control of the flow valve 628 and the flow valve modulator valve 646. This is provided by connection of the G1-lockup line 639 to the bore 662 between the G1 governor plug 660 and a closure plug 673 which closes the right end of the bore. Thus, G1 pressure acting leftward on the full end area of the G1 governor plug 660 provides this bias only when the flow valve 628 is in its no-flow position with no range shift occurring or in its lockup cutoff position on the occurrence of a range shift but with modulator valve 646 in its bypass position below the predetermined part engine throttle opening. When the flow valve 628 is in its lockup cutoff position with the occurrence of a range shift and the flow valve modulator valve 646 is in its exhaust position below part engine throttle opening, the G1 pressure is exhausted from the lockup valve 654. An exhaust 671 prevents hydraulic lock between plug 660 and valve element 658.

A controlled fluid pressure bias at the lockup valve 654 which assists the fixed bias of spring 666 in opposing the G1 pressure bias is normally provided by the TV pressure and is assisted by the T pressure when the latter becomes available. When the lockup valve element 658 is in the release position shown, the TV line 594 is connected past land *a* to chamber 674 in the left end of the bore. The T line 604 is connected by a ball check valve 676 to the chamber 674 and the chamber is always connected through an orifice 678 to an exhaust 680. The orifice 678 maintains the pressure in chamber 674 when it is receiving fluid and relieves the chamber of pressure when there is no supply. The check valve 676 prevents TV pressure from reaching the T line 604 during the time when no T pressure exists which occurs during zero and part engine throttle opening (0–40 percent travel of the primary TV valve element 587).

When converter turbine speed is sufficient to allow lockup clutch operation, G1 pressure which is proportional to converter turbine speed is sufficient to move the lockup valve element 658 leftward to its apply position. The TV pressure which is always available beyond closed engine throttle admitted to chamber 674 past land *a* inhibits the initial leftward movement of the lockup valve. As the lockup valve element 658 moves leftward, land *a* blocks delivery of TV pressure and the chamber 674 is exhausted through orifice 678 to provide further leftward movement by snap action against the spring bias after TV pressure has been overcome. Thus, when the lockup valve element 658 is in its apply position and T pressure is not available, lockup clutch release is delayed by requiring a lower G1 pressure (lower converter turbine speed) to enable the spring bias to move the lockup valve element to its release position.

The T pressure which is provided by TV pressure only from 40 through 100 percent travel of the primary TV valve element 587 is delivered through the check valve 676 to chamber 674 of the lockup valve 654. T pressure below its maximum value delays lockup clutch apply by requiring a higher G1 pressure (higher converter turbine speed) to move the lockup valve element 658 to its apply position. T pressure at its maximum value (100 percent travel of the primary TV valve element 587 with engine throttle open through detent) prevents movement of the lockup valve element 658 to its apply position when it is in its release position and forces movement of the lockup valve element to its release position when it is in its apply position.

The lockup valve 658 in its apply position connects the main line 510 between lands *b* and *c* to the lockup clutch line 668 to engage the lockup clutch 238 and also to urge the main pressure regulator valve element 520 leftward to allow more fluid to flow into the lubrication line 546, such added regulator valve bias effecting a reduction in main pressure which is permissible because lower torque at higher rotating speeds is being transmitted by the power train under these conditions. The lockup valve 658 in its apply position also connects the converter signal line 672 between lands *a* and *b* to an exhaust 682 so that the converter pressure regulator valve 442 regulates at the low value which is possible since with the lockup clutch applied, there is no heat being generated in the torque converter.

FORWARD AND REVERSE SHIFT VALVE

The forward and reverse main line 566 in addition to directing forward and reverse main pressure to the two TV valves 580 and 582, also directs this pressure to a forward and reverse shift valve 684 shown in FIG. 2e. The forward and reverse shift valve 684 is for connecting the forward and reverse main line 566 to either a forward clutch line 686 which delivers the pressure to a motor 688 operating the forward drive clutch 246 or to a reverse clutch line 690 which delivers the pressure to a motor 692 operating the reverse drive clutch 252. The forward and reverse shift valve 684 has a valve element 694 having lands *a, b c* and *d* of equal diameter located in a bore 696 in the valve body. The shift valve element 694 is mechanically detented by diametrically opposed spring loaded balls 698 which engage with either one of a pair of concave surfaces between lands *c* and *d* to hold the shift valve element in either its reverse clutch apply position as shown or its forward clutch apply position.

In the reverse clutch apply position the forward and reverse main line 566 is connected between lands *b* and *c* to the reverse clutch line 690 to apply the reverse drive clutch 252. At the same time, the forward clutch line 686 is connected between lands *a* and *b* to the lubrication line 546 which receives the overage from the main pressure regulator valve 518. The pressure in lubrication line 546 is regulated by a lubrication pressure regulator valve 700 shown in FIG. 2c which has a valve element 702 normally biased to the closed position shown by a regulator spring 704. Pressure in the lubrication line 546 is maintained by regulating action of valve 700 which opens against the spring bias to permit all fluid in excess of that required to maintain lubrication pressure and flow to return to the reservoir via exhaust 706. The regulated lubrication pressure in the lubrication line 546 is low enough so that the fluid at this pressure fills the forward clutch motor 688 but does not effect forward clutch engagement to thus ready the disengaged forward drive clutch for subsequent engagement.

When the forward and reverse shift valve element 694 is moved to the right to the forward clutch apply position through the mechanical detent, the forward and reverse main line 566 is connected between lands $a$ and $b$ to the forward clutch line 686 to apply the forward drive clutch 246. The reverse clutch line 690 is then connected between the lands $b$ and $c$ to the low pressure lubrication line 546 to release the reverse drive clutch 252 while the reverse clutch line 690 and reverse clutch motor 692 are maintained full of fluid at the low lubrication pressure in readiness for subsequent reverse drive clutch engagement.

The positioning of the forward and reverse shift valve element 694 is controlled by fluid pressure bias. The valve bore 696 is closed at both ends providing chambers 710 and 712 at the opposite ends of the valve element 694. Chambers 710 and 712 are simultaneously supplied with fluid from the forward and reverse main line 566 via orifices 713 and 714, respectively, as subsequently described and their closure and exhaust is selectively provided by solenoid valves 715 and 716, respectively. The chambers 710 and 712 are connected to control lines 718 and 720, respectively, and both of the solenoid valves 715 and 716 are normally de-energized in which condition they are closed and block the control lines 718 and 720 from exhausts 722 and 723, respectively, to thus close the chambers. The chambers 710 and 712 when supplied from the forward and reverse main line 566 then have full forward and reverse main pressure which acts on the full end area of lands $a$ and $d$ and thus there is a fluid pressure balance on the valve element 694 and the mechanical detent 698 holds the valve in one of its two positions. The solenoid valves 715 and 716 have internal orifices larger than the orifices 713 and 714 and upon energization of one of the solenoid valves it will be opened and exhaust one chamber of pressure through its internal orifice permitting the retained pressure on the other end of the forward and reverse shift valve element 694 to move the valve through the mechanical detent into the other detented position. With the forward and reverse shift valve 684 in the reverse clutch apply position shown, energization of the solenoid valve 716 exhausts chamber 712 of pressure permitting the retained pressure acting in chamber 710 to move the valve rightward through the detent to the forward clutch apply position. Alternatively, energization of the solenoid valve 715 exhausts chamber 710 permitting the retained pressure in chamber 712 to move the valve leftward to the reverse clutch apply position.

FORWARD AND REVERSE SHIFT INHIBITOR VALVE

A forward and reverse shift inhibitor valve 724 shown in FIG. 2e permits the forward and reverse shift valve 684 to shift the power train between forward and reverse in the first drive range and prevents shifting between forward and reverse in all higher drive ranges. The forward and reverse shift inhibitor valve 724 has a valve element 726 with lands $a$ and $b$ of equal diameter located in a bore 728 in the valve body. The valve 724 further has a G2 plug 730 and a stop plug 732 both of the same diameter as lands $a$ and $b$ located in the bore 728. A spring 734 normally biases the valve members leftward to the position shown with plug 732 acting as a stop. In this position which is the forward-reverse shift permit position the forward and reverse main line 566 is connected through the valve 724 between its lands $a$ and $b$ and then through the orifices 713 and 714 to the respective chambers 710 and 712 of the forward and reverse shift valve 684. Thus, with the forward and reverse shift inhibitor valve 724 in its forward-reverse shift permit position, the forward and reverse shift valve 684 may be operated by its solenoid valves 715 and 716 to selectively apply the forward drive clutch 246 and the reverse clutch 252.

Forward-reverse shift prevention is provided by connecting the G2 line 577 to deliver G2 pressure to a chamber 736 where it acts on the full left end area of the G2 plug 730 to urge the G2 plug and valve element 726 rightward against the spring bias to an inhibit position in which land $a$ of the valve element blocks the forward and reverse main line 566 at the upstream side of the valve and connects the forward and reverse main line 566 at the downstream side to an exhaust 740. With both chambers 710 and 712 of the forward and reverse shift valve 684 thus exhausted by the forward and reverse shift inhibitor valve 724, operation of the solenoid valves 715 and 716 is ineffective to shift the forward and reverse shift valve 684 from the position it then occupies which will either be forward or reverse. Since G2 pressure is proportional to the range unit output speed which is zero throughout the first drive range, no G2 pressure is delivered to the forward and reverse shift inhibitor valve 684 during first drive range operation in either forward or reverse and thus the forward and reverse shift inhibitor valve will be in its permit position as shown to permit the operator to shift the power train between forward and reverse in the first drive range. Exhausts 740, 742 and 744 are provided to prevent hydraulic lock in the forward and reverse shift inhibitor valve 724.

When the vehicle is moving in either the forward or reverse direction in either the second, third or fourth drive range the G2 pressure is always present and conditions the forward and reverse shift inhibitor valve 724 in its inhibit position to prevent the forward and reverse shift valve 684 from effecting shifts between forward and reverse. Thus, the operator is prevented from making a shift between forward and reverse in the second, third and fourth drive range which might overload the power train, shifts between forward and reverse in the first drive range being permitted for rocking the vehicle in low traction situations.

SEQUENCE VALVE

A sequence valve 746 shown in FIG. 2e is for disengaging the low low brake 318 during shifts between the first forward and first reverse drive range to permit engagement of the directional clutches (clutches 246 and 252) under no load conditions recalling that directional changes are prevented in the second, third and fourth drive range in forward and reverse by the forward and reverse shift inhibitor valve 724. The sequence valve 746 has a valve element 748 having lands $a$ and $b$ of equal diameter and a plug 750 of the same diameter located in a bore 752 in the valve body. The valve elements 748 and 750 are biased rightward by a spring 754 to the position shown which is the release position. In the release position, a 1–2 line 756 which normally connects the range line 626 to engage the low low brake 318 as described in more detail later is connected between the lands a and b of valve element 748 to an exhaust 758 to release the low low brake 318.

The forward clutch line 686 and reverse clutch line 690 from the forward and reverse shift valve 684 are continuously connected to the bore 752 of the sequence valve 746 at the right end of plug 750 and between valve element 748 and plug 750, respectively. Thus, when the reverse drive clutch 252 is engaged with the forward and reverse shift valve 684 in the reverse clutch apply position shown, forward and reverse main pressure acts on both the full right end area of land b of the valve element 748 and the full left end area of plug 750 while the lower lubrication pressure acts on the full right end area of valve plug 750. The fluid pressure imbalance on plug 750 holds it in the position shown and the fluid pressure on valve element 748 moves it leftward against the spring bias to a normal apply position. In the normal apply position, land b of valve element 748 blocks exhaust 758 and the 1–2 line 756 is connected through the valve between lands a and b for main pressure transmittal to engage the low low brake 318. When the forward and reverse shift valve 684 is operated to change vehicle direction from reverse to forward in the first drive range which normally has the low low brake 318 engaged, the forward clutch line 686 is supplied with fluid from the forward and reverse main line 566 which fluid is also admitted to act on the right end of plug 750 while the reverse clutch line 690 is filled with lubrication fluid which is also admitted to act on the right end of land b and on the left end of plug 750. As the forward clutch 246 is engaged and with the leftward acting fluid pressure on the valve element 748 thus reduced to the low lubrication pressure, the leftward acting pressure on plug 750 is below the normal forward and reverse main pressure because of the flow requirements for the clutch engagement. This permits the spring 754 to move the valve element 748 rightward to its release position against plug 750 which remains to the right so that while the forward drive clutch 246 is being engaged, the 1–2 line 756 is exhausted through exhaust 758 to drop out or release the low low brake 318. The pressure in the forward clutch line 686 rises with engagement of the forward drive clutch until full forward and reverse main pressure is reached. Full forward and reverse main pressure or a slightly lower pressure is effective to move plug 750 and the contacting valve element 748 leftward to reestablish connection of the 1–2 line 756 through the valve and thus reestablish engagement of the low low brake 318.

When the forward and reverse shift valve 684 is operated to change vehicle direction from forward to reverse in the first drive range, the fluid from the forward and reverse main line 566 is admitted to act on the right end of land b of valve element 748 and the left end of plug 750 while lubrication fluid is admitted to act on the right end of plug 750. As the reverse drive clutch 252 is engaged and with the leftward acting pressure on the plug 750 thus reduced to the low lubrication pressure, the fluid pressure acting leftward on the valve element 748 and rightward on the plug 750 is below the normal forward and reverse main pressure because of the flow requirements for the clutch engagement. This permits the spring 754 to move the valve element 748 and contacting plug 750 rightward to the release position so that while the reverse drive clutch 252 is being engaged, the low low brake 318 is released. The pressure in the reverse clutch line 690 rises with engagement of the reverse drive clutch until full forward and reverse main pressure is reached. Full forward and reverse main pressure or a slightly lower pressure is effective to move valve element 748 leftward to its apply position to reestablish engagement of the low low brake 318 while the plug 750 is held to the right by its pressure imbalance.

NEUTRAL SHIFT VALVE

A neutral shift valve 759 shown in FIG. 2b if for conditioning the power train in neutral and has a valve element 760 having lands a and b of equal diameter located in a bore 762 in the valve body. A spring 764 urges the valve element 760 toward the neutral position shown in which land a blocks the range main line 626 upstream of the valve and connects the range main line downstream of the valve between the lands a and b to an exhaust 768. The forward and reverse main line 566 is connected through an orifice 770 to a chamber 772 at the right end of the valve element 760. A solenoid valve 774 is connected by a control line 776 to the chamber 772 and when de-energized blocks the line 776 and thus chamber 772 from an exhaust 778. When the chamber 772 is thus blocked, the chamber is filled through orifice 770 and the pressure rises to full forward and reverse main pressure. This pressure acts on the full end area of land b and is effective to move the valve element 760 leftward to a range shift position. The valve element 760 in the range shift position connects the range main line 626 through the valve between lands a and b while land b blocks exhaust 768, an exhaust 779 preventing hydraulic lock in the valve.

When the solenoid valve 774 is energized it connects the chamber 772 via the line 776 to the exhaust 778 through an internal orifice larger than orifice 770 to prevent pressure buildup in the chamber which is being continuously fed through orifice 770. This pressure exhaust permits the spring 764 to move the valve element 760 to its neutral position blocking the range main line 626 at the upstream side and exhausting the downstream range main line.

MANUAL SIGNAL VALVE

A manual signal valve 780 shown in FIG. 2b provides selective delivery of forward and reverse main pressure for manually controlled shifts to all the drive ranges below the highest (1, 2 and 3) and T pressure for all automatic shifts. The manual signal valve 780 has a valve element 782 having lands a, b and c of equal diameter located in portion 784 of a stepped bore 785 in the valve body and a land d of smaller diameter located in bore portion 788. A spring 790 biases the valve element 782 rightward toward the manual signal position shown. In this position, the T line 604 is blocked at the upstream side of the valve by land a and is connected at the downstream side of the valve between the lands a and b to an exhaust 789. In addition, the forward and reverse main line 566 is connected in the manual signal position through the manual signal valve between lands $b$ and $c$.

The forward and reverse main line 566 upstream of the manual signal valve 780 is always connected through an orifice 792 to a chamber 794 at the step in bore 785, the effective right end area of land $c$ of valve element 782 (land $c$ minus land $d$) always being exposed to this chamber. The chamber 794 downstream of orifice 792 is connected by line 566 to a solenoid valve 798. The solenoid valve 798 when deenergized blocks the chamber 794 from an exhaust 800 so that pressure builds in the blocked chamber to full forward and reverse main pressure. When the solenoid valve 798 is energized it connects chamber 794 to the exhaust 800 through an internal orifice larger than orifice 792 to prevent pressure buildup in this chamber.

The forward and reverse main line 566 upstream of the manual signal valve 780 is also always connected through an orifice 801 to a chamber 802 in the right end of bore 785, the full right end area of land $d$ of valve element 782 being exposed to this chamber. The chamber 802 downstream of orifice 801 is connected by line 566 to a solenoid valve 803. The solenoid valve 803 when de-energized blocks the chamber 802 from an exhaust 804 so that pressure builds in the blocked chamber to full forward and reverse main pressure. When the solenoid valve 803 is energized it connects chamber 802 to the exhaust 804 through an internal orifice larger than orifice 801 to prevent pressure buildup in this chamber.

The fluid pressure force required to overcome the force of spring 790 to move valve element 782 leftward to an automatic signal position is provided only when full forward and reverse main pressure is present in both chambers 794 and 802, i.e., only when both solenoid valves 798 and 803 are de-energized. In the automatic signal position, the T line 604 is connected through the manual signal valve 780 between its lands $a$ and $b$ and the forward and reverse main line 566 downstream of this valve is connected between lands $b$ and $c$ to exhaust 789 while this line at the upstream side of this valve is blocked by land $c$.

AUTOMATIC SHIFT INHIBITOR VALVE

An automatic shift inhibitor valve 806 shown in FIG. 2c is for inhibiting automatic range shifting during steering operation. This valve has a valve element 808 having lands $a$, $b$ and $c$ of equal diameter and a valve element or plug 810 of the same diameter all located in a bore 812 in the valve body. A spring 814 normally biases the valve elements 808 and 810 to the position shown which is an automatic shift permit position. In this position, the T line 604 is connected to the manual signal valve 780 through the automatic shift inhibitor valve 806 between lands $a$ and $b$ and the range TV line 610 is connected through the automatic shift inhibitor valve between lands $b$ and $c$ while the forward and reverse main line 566 which is continuously connected through the valve body of the secondary TV valve 582 as shown is blocked at the automatic shift inhibitor valve by its land $b$.

A chamber 816 at the right end of the valve bore 812 is connected to receive a signal pressure indicating steering operation from the hydrostatic steer control portion of the system later described. When the steer signal pressure is provided, it acts on the full right end area of plug 810 to move it and the contacting valve element 808 leftward to a shift inhibit position. In this position, the T line 604 which is connected to the manual signal valve 780 downstream of the automatic shift inhibitor valve 806 is connected between lands $a$ and $b$ to an exhaust 818 and the forward and reverse main line 566 is connected between lands $b$ and $c$ to the range TV line 610 downstream of the automatic shift inhibitor valve while the range TV line 610 at the upstream side is blocked by land $c$.

Thus, provided there is no steering operation occurring, the T and range TV pressures are made available by the automatic shift inhibitor valve 806 to control range shifting as later described. When steering operation occurs in any range during automatic operation, the downstream T pressure is exhausted by the automatic shift inhibitor valve 806 which then delivers forward and reverse main pressure instead of range TV pressure to range TV line 610 downstream of this valve for inhibiting automatic shifting during steering.

1-2 RANGE SHIFT VALVE

A 1-2 range shift valve 820 shown in FIG. 2b controls the engagement of both the low low brake 318 and the low brake 271 to establish the first and second drive range, respectively. The 1-2 range shift valve 820 has a shift valve element 821 having lands $a$, $b$, $c$ and $d$ located in a stepped bore 822 in the valve body. The shift valve element is biased rightward toward a downshift position as shown by a spring 824 acting through a contacting downshift plunger 826 having a land $a$ located in the left end of bore 822. In the downshift position, the 1-2 line 756 downstream of the sequence valve 746 is connected between lands $b$ and $c$ of shift valve element 821 to a low low brake line 827 that is connected to a motor 828 shown in FIG. 2a which operates the low low brake 318. The 1-2 range shift valve in the downshift position also connects an exhaust 829 between lands $c$ and $d$ to a low brake line 830, this line being connected to a motor 831 shown in FIG. 2a which operates the low brake 271. Thus, with the 1-2 range shift valve in its downshift position, the low low brake 318 is engaged provided the 1-2 line 756 is supplied with pressure and the low brake 271 is disengaged to produce the first drive range.

The 1-2 range shift valve 820 further has a plug or valve element 832 having a land $a$ and a larger land $b$ located in the right end of bore 822. The left end of land $a$ of the plug 832 contacts the right end of valve element 821 and the G1 line 573 whose G1 pressure is used to provide an upshift control pressure is connected to the bore 822 between land $a$ and $b$ of the plug 832 in the downshift position and is always connected to the closed right end of bore 822. G1 pressure acts on the unbalanced area of land $b$ of the plug 832 to urge movement of the valve element 821 leftward towards its upshift position. This upshift converter turbine speed governed bias is resisted by the constant bias of spring 824 and a controlled pressure downshift bias which is provided by range TV pressure in the downshift position and by T pressure in the upshift position when the latter pressure becomes available. This downshift control pressure bias is effected by connection of the range TV line 610 downstream of the automatic shift inhibitor valve 806 to the bore 822 between land $a$ of the downshift plunger 826 and land $a$ of the valve element 821 only when the 1–2 range shift valve is in its downshift position and continuous connection of the T line 604 downstream of the manual signal valve 780 through a ball check valve 838 to this same location which is always connected through an orifice 840 to an exhaust 842. Land $a$ of valve element 821 is larger in diameter than land $a$ of the downshift plunger 826 so that there is an unbalanced pressure area to provide the rightward downshift throttle pressure force. The orifice 840 maintains the downshift pressure bias as long as there is fluid supply. The check valve 838 prevents range TV pressure from reaching the T line 604 when no T pressure exists.

During automatic operation, upshifting occurs when the G1 pressure acting leftward on the unbalanced area of plug 832 is greater than the downshift bias of the spring 824 and the range TV pressure acting rightward on the unbalanced area of land $a$ of valve element 821. During initial leftward upshift movement of the plug 832 the space between its lands $a$ and $b$ is connected to an exhaust 844 while land $b$ closes this space to the G1 line 573 so that the full end area of land $b$ is effectively acted on by G1 pressure to accelerate leftward upshift valve movement. In the upshift position land $a$ of the valve element 821 blocks the range TV line 610 from bore 822 so that the range TV pressure previously acting on the unbalanced area of this land is relieved through orifice 840 to exhaust 842. In the upshift position, the low low brake line 827 is connected between lands $b$ and $c$ of valve element 821 to an exhaust 846 to release the low low brake 318 while the 1–2 line 756 downstream of the sequence valve 746 is connected between lands $c$ and $d$ of valve element 821 to the low brake line 830 to engage the low brake 271 to establish the second drive range.

When vehicle speed reduces sufficiently for the bias provided by spring 824 to overcome the G1 pressure force, the 1–2 range shift valve 820 downshifts. As the shift valve element 821 moves rightward towards its downshift position, range TV pressure is restored to act on the unbalanced end area of land $a$ of valve element 821. Downshifting is accelerated or made to occur earlier than the fixed downshift condition described above when there is large torque demand. This is provided by the use of T pressure from the T line 604 downstream of the manual signal valve 780. The T pressure acts on the left end area of land $a$ of the valve element 821 to provide a downshift bias which is greater than the bias of spring 824 and increases with torque demand. Thus, above the 40 percent travel in the primary TV valve 580 where only then T pressure is made available and where large torque demand is being experienced, a 2–1 downshift is made to occur earlier than it normally would without the added T pressure bias. Exhausts 834, 835 and 836 are connected to bore 822 as shown to prevent hydraulic lock.

A hysteresis effect provides for snap action of the 1–2 range shift valve to its upshift and downshift position to prevent partial or vibratory valve movement. For this purpose the lands of valve element 821 are sized so that land $a$ is slightly larger in diameter than land $b$, land $b$ is equal in diameter to land $c$, and land $c$ is slightly larger in diameter than land $d$, the valve bore 822 being stepped accordingly. When the shift valve element 821 is in its downshift position as shown, there is no hysteresis force provided and as it is moved leftward towards its upshift position a hysteresis chamber 848 between lands $a$ and $b$ of the valve element is opened to the forward and reverse main line 566 while land $b$ moves to block an exhaust 850 which serves to exhaust this chamber on downshifting. The forward and reverse main pressure thus admitted to the hysteresis chamber 848 acts on the unbalanced area of land $a$ of valve element 821 to provide an unbalanced force snapping the valve element leftward to its upshift position. In the upshift position the main pressure transmitted between lands $c$ and $d$ for the second drive range establishment acts leftward on the unbalanced area of land $c$ to aid in holding the valve element 821 in its upshift position. When downshift movement occurs, the unbalanced hysteresis force on land $c$ is first relieved through exhaust 829 and then the pressure in hysteresis chamber 848 is relieved through exhaust 850 to provide snap action in the rightward movement of the valve element 821 to its downshift position.

The supply of fluid at G1 pressure is supplemented by a G1 accumulator 852 shown in FIG. 2b. This is to ensure that upshift movement of the 1–2 range shift valve after it has been initiated is maintained by the G1 pressure which signaled for the shift, i.e., prevent a pressure drop in G1 pressure during the shift because of the increasing volume and since G1 pressure normally tends to drop after the shift as the result of the ratio change. The G1 accumulator 852 has a piston 854 located in a bore 856 in the accumulator body which piston is urged leftward by a spring 858. The G1 line 573 is connected downstream of an orifice 860 to the closed left end of bore 856 so that G1 pressure acts to move piston 854 rightward against spring 858 to normally maintain the G1 accumulator charged with a volume of fluid at G1 pressure. Thus, when fluid at G1 pressure from the G1 line 573 is used to move the 1–2 range shift valve towards its upshift position, the G1 accumulator 852 supplements the main fluid supply to help maintain G1 pressure at the 1–2 range shift valve for the upshift with orifice 860 helping to maintain G1 pressure upstream of the 1–2 range shift valve. The low brake line 830 is connected to the closed right end of bore 856 of the G1 accumulator valve 852 so that it adds to the bias of spring 858 to boost the accumulator valve action during the upshift.

Control of the 1–2 range shift valve 820 for manual selection of the first drive range from a higher range is provided by a piston 861 located in a bore 862 in the valve body and contactable with the left end of downshift plunger 826. The bore 862 at the left end or head of piston 861 is connected to the forward and reverse main line 566 downstream of the manual signal valve 780. Thus, when the solenoid valve 798 is energized to condition the manual signal valve 780 in its manual signal position, the T pressure downshift bias, if it was available, on the 1–2 range shift valve is relieved and the forward and reverse main pressure acts rightward on the piston 861 to apply a constant downshift bias to the plunger 826 and thus the valve element 821 and plug 832 in addition to the constant downshift bias of spring 824. The constant total downshift bias thus provided for manual selection of the first drive range is determined so that a 2–1 downshift will occur only below a predetermined G1 pressure to prevent first drive range establishment at vehicle speeds that would be excessive for this drive range.

Manual control of the 1–2 range shift valve 820 for manual selection of the second drive range is provided by a plunger 863 which is located in a bore 864 of the valve body and has a projection 865 extending through wall 866 to contact the right end of plug 832. Plunger 863 is urged leftward by a spring 867. A chamber 868 provided by bore 864 to the left of plunger 863 is continuously connected to the forward and reverse main line 566 downstream of orifice 801 and is continuously connected to the solenoid valve 803 downstream of orifice 801 like chamber 802 of the manual signal valve 780.

The solenoid valve 803 when de-energized blocks the chamber 868 from exhaust 804 so that pressure builds in chamber 868 to full forward and reverse main pressure which is effective to hold plunger 863 in the position shown against the bias of spring 867. In this position the plunger 863 acts as a stop for the plug 832 and has no other effect to permit automatic operation of the 1–2 range shift valve.

When the solenoid valve 803 is energized it acts to relieve chamber 868 of pressure through exhaust 804. This permits the spring 867 to apply a constant upshift bias through plunger 863 to the plug 832 and thus valve element 821 in addition to the G1 pressure upshift bias. Thus, when the solenoid valve 803 is energized to condition the manual signal valve 780 in its manual signal position, the constant total downshift bias is provided as previously described with the solenoid valve 798 energized but now this downshift bias is opposed by the added constant upshift bias. The total upshift bias thus provided for manual selection of the second drive range is determined so that a 1–2 upshift will occur immediately and throughout the G1 pressure range in the first drive range including when the vehicle is stationary with G1 pressure at zero.

2–3 RANGE SHIFT VALVE

A 2–3 range shift valve 870 shown in FIG. 2b controls the engagement of the intermediate clutch 276 to establish the third drive range and also selectively permits and prevents establishment of the first and second drive range. The 2–3 range shift valve 870 has a valve element 872 having lands $a$, $b$, $c$ and $d$ located in a stopped bore 874 in the valve body. The valve element 872 is biased rightward toward a downshift position as shown by a spring 876 acting through a contacting downshift plunger 878 having a land $a$ located in the left end of bore 874. In the downshift position, the range main line 626 downstream of the neutral shift valve 759 is connected between lands $b$ and $c$ of valve element 872 to the 1–2 line 756 at the latter line's point of origination. The 2–3 range shift valve in the downshift position also connects an exhaust 880 between lands $c$ and $d$ to an intermediate brake line 882, this line being connected to a motor 884 shown in FIG. 2a which operates the intermediate brake 276. Thus, when the 2–3 range shift valve 870 is in its downshift position, the intermediate brake 276 is disengaged and fluid in the range main line 626 is permitted to pass to the 1–2 line 756 for delivery to the 1–2 range shift valve 820 for establishment of the first and second drive range.

The 2–3 range shift valve 870 also has a plug or valve element 885 located in the right end of bore 874. The left end of plug 885 contacts the right end of valve element 872 and the G2 line 577 whose G2 pressure is used to provide an upshift control pressure is connected to the closed right end of bore 874. G2 pressure acts on the full right end area of plug 885 to urge movement of the valve element 872 leftward towards its upshift position. This upshift output speed governed bias is resisted by the constant bias of spring 876 and a controlled pressure downshift bias which is provided by range TV pressure in the downshift position and by T pressure in the upshift position when the latter pressure becomes available. This downshift control pressure bias is effected by connection of the range TV line 610 downstream of the automatic shift inhibitor valve 806 to the bore 874 between land $a$ of the downshift plunger 878 and land $a$ of the valve element 872 only when the 2–3 range shift valve is in its downshift position and continuous connection of the T line 604 downstream of the manual signal valve 780 through a ball check valve 886 to this same location which is always connected through an orifice 887 to an exhaust 888. Land $a$ of valve element 872 is larger in diameter than land $a$ of the downshift plunger 878 so that there is an unbalanced pressure area to provide the rightward downshift throttle pressure force. The orifice 887 maintains the downshift pressure bias as long as there is fluid supply and the check valve 886 prevents range TV pressure from reaching the T line 604 when no T pressure exists.

During automatic operation, upshifting occurs when G2 pressure acting leftward on plug 885 is greater than the downshift bias of the spring 876 and the range TV pressure acting rightward on the unbalanced area of land $a$ of valve element 872. In the upshift position, land $a$ of valve element 872 blocks the range TV line 610 from bore 874 so that the range TV pressure previously acting on the unbalanced area of this land is relieved through orifice 887 to exhaust 888. In the upshift position, the 1–2 line 756 is disconnected from the range main line 626 and connected between lands $b$ and $c$ to exhaust 889 to release the low brake 271 with the range main line 626 then being connected between lands $c$ and $d$ to the intermediate brake line 882 to engage the intermediate brake 276 to establish the third drive range with land $d$ blocking exhaust 880.

When vehicle speed reduces sufficiently for the bias provided by spring 876 to overcome the G2 pressure force, the 2–3 range shift valve 870 downshifts to establish the second drive range. Downshifting is accelerated or made to occur earlier than the fixed downshifting described above when there is large torque demand. This is provided by the use of T pressure from the T line 604 downstream of the manual signal valve 780. The T pressure acts on the unbalanced left end area of land $a$ of valve element 872 to assist the spring 876 and provide a downshift bias which then increases with torque demand. Thus, above the 40 percent travel in the primary TV valve 580 where only then T pressure is made available and where large torque demand is being experienced, a 3–2 downshift is made to occur earlier than it normally would without the T pressure bias. The intermediate brake line 882 is connected through an orifice 890 to a chamber 891 behind upshift plunger 863 of the 1–2 range shift valve 820 so that when the 2–3 range shift valve 870 is in its upshift position establishing the third drive range, main pressure is also in chamber 891 to permit the spring 867 to aid G1 pressure in holding the 1–2 range shift valve 820 in its upshift position for a 3–2 downshift. Exhausts 893, 894 and 895 are connected to bore 874 as shown to prevent hydraulic lock.

A hysteresis effect is provided for snap action of the 2–3 range shift valve 870 to its upshift and downshift position to prevent partial or vibratory valve movement. For this purpose, the lands of valve element 872 are sized so that land a is slightly larger in diameter than land b, land b is equal in diameter to land c and land c is slightly larger in diameter than land d, the valve bore 874 being stepped accordingly. When the valve element 872 is in its downshift position as shown, there is no hysteresis force provided and as it is moved leftward towards its upshift position, a hysteresis chamber 896 between lands a and b of the valve element is opened to the forward and reverse main line 566 while land b moves to block an exhaust 898 which serves to exhaust this chamber on downshifting. The forward and reverse main pressure thus admitted to the hysteresis chamber 896 acts on the unbalanced area of land a of valve element 872 to provide an imbalance snapping the valve element leftward to its upshift position. In the upshift position, the main pressure transmitted between lands c and d for the second drive range establishment acts leftward on the unbalanced area of land c to aid the holding valve element 872 in its upshift position. When downshift movement occurs, the unbalanced hysteresis force on land c is first relieved through exhaust 880 and then the pressure in hysteresis chamber 896 is relieved through exhaust 898 to provide snap action in the rightward movement of valve element 872 to its downshift position.

To insure that upshift movement of the 2–3 range shift valve, after it has been initiated, is maintained by the G2 pressure which signalled for the shift, the supply of fluid at G2 pressure is supplemented by a G2 accumulator 899 shown in FIG. 2b. The G2 accumulator 899 has a piston 900 located in a bore 901 in the accumulator body which piston is urged rightward by spring 902. The G2 line 577 is connected downstream of an orifice 903 to the closed right end of bore 901 so that G2 pressure acts to move piston 900 leftward against spring 902 to normally maintain the G2 accumulator charged with a volume of fluid at G2 pressure. Thus, when fluid at G2 pressure from the G2 line 577 is used to move the 2–3 range shift valve towards the upshift position, the G2 accumulator 899 supplements the fluid supply to help maintain G2 pressure at the 2–3 range shift valve for the upshift with orifice 903 helping to maintain G2 pressure upstream of the 2–3 range shift valve. An exhaust 904 connected to bore 901 behind the piston 900 prevents hydraulic lock in the G2 accumulator.

Automatic downshift control of the 2–3 range shift valve 870 for manual range selection is provided by a piston 906 located in a bore 907 in the valve body and contactable with the left end of downshift plunger 878. The bore 907 at the left end or head of piston 906 is connected to the forward and reverse main line 566 downstream of the manual signal valve 780. Thus, when the solenoid valve 798 is energized to condition the manual signal valve 780 in its manual signal position, the T pressure downshift bias, if it was available to the 2–3 range shift valve, is relieved and the forward and reverse main pressure acts rightward on the piston 906 to apply a constant downshift bias to the plunger 878 and thus the valve element 872 and plug 885 in addition to the constant downshift bias of spring 876. The constant total downshift bias thus provided is determined so that a 3–2 downshift will occur only below a predetermined G2 pressure to prevent second drive range establishment at vehicle speeds that would be excessive for this drive range.

Manual control of the 2–3 range shift valve 870 for manual selection of the third drive range is provided by a plunger 908 which is located in a bore 909 of the valve body and has a projection 910 extending through wall 911 to contact the right end of plug 885. Plunger 908 is urged leftward by springs 912. A chamber 914 provided by bore 909 to the left of plunger 908 is continuously connected to the forward and reverse main line 566 downstream of an orifice 916 and is continuously connected downstream of this orifice to a solenoid valve 918. The solenoid valve 918 when de-energized blocks the chamber 914 from an exhaust 919 so that pressure builds in the blocked chamber to full forward and reverse main pressure which is effective to hold plunger 908 in the position shown against the bias of springs 912. In this position the plunger 908 acts as a stop for plug 885 and has no other effect to permit automatic operation of the 2–3 range shift valve.

When the solenoid valve 918 is energized, it connects the chamber 914 to the exhaust 919 through an internal orifice larger than orifice 916 to prevent pressure buildup in this chamber. This permits the springs 912 to apply a constant upshift bias through plunger 908 to plug 885 and valve element 872 in addition to the G2 pressure upshift bias. Thus, when the solenoid valve 798 is energized to condition the manual signal valve 780 in its manual signal position, a constant total downshift bias is provided as previously described but now this downshift bias is opposed by the added constant upshift bias. The total upshift bias thus provided for manual selection of the third drive range is determined so that a 2–3 upshift will occur immediately and throughout the G2 pressure range in the second drive range. Thus, if the operation prior to manual selection was lower than third, the shift to the third drive range immediately takes place. An exhaust 920 connected to the bore 909 behind plunger 908 prevents hydraulic lock of the plunger.

3–4 RANGE SHIFT VALVE

A 3–4 range shift valve 922 shown in FIG. 2b controls the engagement of the high clutch 278 to establish the fourth drive range and also selectively permits and prevents establishment of all the lower drive ranges, namely first, second and third drive range. The 3–4 range shift valve 922 has a valve element 924 having lands a, b, c and d located in a stepped bore 925 in the valve body. The valve element 924 is biased rightward toward a downshift position as shown by spring 926 acting through a contacting downshift plunger 927 which has a land *a* located in the left end of bore 925. In the downshift position, the range main line 626 downstream of the neutral shift valve 759 is connected through the 3–4 range shift valve between lands *b* and *c* of valve element 924 to the 2–3 range shift valve 870. The 3–4 range shift valve in the downshift position also connects an exhaust 928 between lands *c* and *d* to a high clutch line 929, this line being connected to a motor 930 shown in FIG. 2*a* which operates the high clutch 278. Thus, when the 3–4 range shift valve 922 is in its downshift position, the high clutch 278 is disengaged and fluid is permitted to pass through the range main line 626 to the 2–3 range shift valve 870 for establishment of the first, second and third drive range.

The 3–4 range shift valve 922 also has a plug or valve element 931 located in the right end of bore 925. The left end of plug 931 contacts the right end of valve element 924 and the G2 line 577, whose G2 pressure is used to provide an upshift control pressure, is connected to the closed right end of bore 925. G2 pressure acts on the full right end area of plug 931 which is smaller than the corresponding area of plug 885 of the 2–3 range shift valve 870 to urge movement of the valve element 924 leftward towards the upshift position. This upshift output speed governed bias is resisted by the constant bias of spring 926 and a controlled pressure downshift bias which is provided by the range TV pressure in the downshift position and by the T pressure in the upshift position when the latter pressure becomes available. This downshift control pressure bias is effected by connection of the range TV line 610 downstream of the automatic shift inhibitor valve 806 to the bore 925 between land *a* of downshift plunger 927 and land *a* of valve element 924 only when the 3–4 range shift valve is in its downshift position and continuous connection of the T line 604 downstream of the manual signal valve 780 through a ball check valve 932 to this same location which is always connected through an orifice 934 to an exhaust 935. The pressure acts on the left end area of land *a* of valve element 924 to provide the rightward downshift throttle pressure force. The orifice 934 maintains the downshift pressure bias as long as there is fluid supply and the check valve 932 prevents range TV pressure from reaching the T line 604 when no T pressure exists.

During automatic operation, upshifting occurs when the G2 pressure acting on the full right end area of plug 931 is greater than the range TV pressure acting rightward on the area of land *a* of valve element 924. The end area of plug 931 is smaller than that of plug 885 of the 2–3 range shift valve 870 so that a higher G2 pressure (higher vehicle speed) is required for upshifting of the 3–4 range shift valve as compared with that of the 2–3 range shift valve. In the upshift position, land *a* of valve element 924 blocks the range TV line 610 from the bore 925 so that the range TV pressure previously acting on the area of this land is relieved through orifice 934 to exhaust 935. In the upshift position, the range main line 626 downstream of the 3–4 range shift valve is connected between lands *b* and *c* to an exhaust 936 so that establishment of all the lower drive ranges is prevented while the range main line 626 upstream of the valve is connected between lands *c* and *d* of the valve element 924 to the high clutch line 929 to engage the high clutch 278 to establish the fourth drive range.

Upshift movement of the 3–4 range shift valve by G2 pressure after it has been initiated, is insured by supplemental fluid supply from the G2 accumulator which also helps maintain G2 pressure upstream of the 3–4 range shift valve.

When vehicle speed reduces sufficiently for the bias provided by spring 926 to overcome the G2 pressure force, the 3–4 range shift valve 922 downshifts. As valve element 924 moves rightward towards the downshift position, range TV pressure is restored to act on the unbalanced end area of land *a* of the valve element 924. Downshifting is accelerated or made to occur earlier when there is large torque demand. This is provided by the use of T pressure from the T line 604 downstream of the manual signal valve 780. The T pressure acts on the left end area of land *a* of valve element 924 to provide a downstream bias which is greater than the bias of spring 926 and increases with torque demand. Thus, above the 40 percent travel in the primary TV valve 580 where only then T pressure is made available and where large torque demand is being experienced, a 4–3 downshift is made to occur earlier than it normally would without the T pressure bias. Exhausts 937, 938 and 939 are connected to bore 925 as shown to prevent hydraulic lock.

A hysteresis effect is provided for snap action of the 3–4 range shift valve to its upshift and downshift position to prevent partial or vibratory valve movement. For this purpose the lands of valve element 924 are sized so that land *a* is slightly larger in diameter than land *b*, land *b* is equal in diameter to land *c* and land *c* is slightly larger in diameter than land *d*, the valve bore 925 being stepped accordingly. When valve element 924 is in its downshift position as shown, there is no hysteresis force provided and as it is moved leftward towards its upshift position, a hysteresis chamber 940 between lands *a* and *b* of the valve element is opened to the forward and reverse main line 566 while land *b* moves to block an exhaust 941 which serves to exhaust this chamber on downshifting. The forward and reverse main pressure thus admitted to the hysteresis chamber 940 acts on the unbalanced area of land *a* of the valve element to provide an unbalanced force snapping the valve element leftward towards its upshift position. In the upshift position the main pressure transmitted between lands *c* and *d* for the fourth drive range establishment acts leftward on the unbalanced area of land *c* to aid in holding the valve element 924 in its upshift position. When downshift movement occurs, the unbalanced hysteresis force on land *c* is first relieved by exhaust 928 and then the pressure in hysteresis chamber 940 is relieved through exhaust 941 to provide snap action in the rightward movement of the shift valve element 924 to its downshift position.

Automatic downshift control of the 3–4 range shift valve 922 for manual range selection is provided by a piston 942 located in a bore 944 in the valve body and contactable with the left end of downshift plunger 927. The bore 944 at the left end or head of piston 942 is connected to the forward and reverse main line 566 downstream of the manual signal valve 780. Thus, when the solenoid valve 798 is energized to condition the manual signal valve 780 in its manual signal position, the T pressure bias, if it was available to the 3–4 range shift valve, is relieved and the forward and reverse main pressure acts rightward on the piston 942 to apply a constant downshift bias to the plunger 927 and thus the valve element 924 and plug 931 in addition to the constant downshift bias of spring 926. The constant total downshift bias thus provided for manual selection of a lower drive range is determined so a 4–3 downshift will occur only below a predetermined G2 pressure to prevent third drive range establishment at vehicle speeds that would be excessive for this drive range.

Manual control of the 3–4 range shift valve 922 for manual selection of the fourth drive range is provided by a plunger 945 which is located in a bore 946 of the valve body and has a projection 947 extending through wall 948 to contact the right end of plug 931. Plunger 945 is urged leftward by springs 949. A chamber 950 provided by bore 946 to the left of plunger 945 is continuously connected to the forward and reverse main line 566 through an orifice 951 and continuously connected downstream of this orifice to a solenoid valve 95.

The solenoid valve 952, when de-energized blocks the chamber 950 from an exhaust 954 so that pressure in the chamber 950 builds to full forward and reverse main pressure which is effective to hold the plunger 945 in the position shown against the bias of springs 949. In this position the plunger 945 acts as a stop for plug 931 and has no other effect to permit automatic operation of the 3–4 range shift valve. When the solenoid valve 952 is energized it connects chamber 950 to the exhaust 954 through an internal orifice larger than orifice 951 to relieve the chamber of pressure. This permits the springs 949 to apply a constant upshift bias through plunger 945 to plug 931 and thus valve element 924 in addition to the G2 pressure upshift bias. The total upshift bias thus provided for manual selection of the fourth drive range is determined so that a 3–4 upshift will occur immediately, i.e., is greater than any combination of any downshift forces.

OPERATOR'S CONTROLS

The operator's controls in the power train control system is shown in FIG. 4 and comprises a selector box 956 located in the operator compartment of the vehicle and remote from the power train. The controls comprise a forward and reverse shift lever 958 and a manual and automatic range shift lever 960 both suitably supported for pivotal movement on the box 956. Each of the solenoid valves previously described is controlled at the selector box 956 by the operator manipulating the shift levers 960 and 958. A suitable DC power source 962 makes electrical energy available to a power line 964. Power line 964 connects the power source 962 to four spring biased, normally open, single throw, single pull switches 966, 968, 970 and 972. Power line 964 also connects the power source 962 to a spring biased, normally open, single throw, double pull switch 974 and a single pull, double throw switch 976. The switch 976 is controlled by the forward and reverse shift lever 958 and the remaining five switches are controlled by the manual and automatic shift lever 960 which operates in a gate 977 in the selector box.

The switch 976 has two stationary contacts 978 and 980 and a movable contact 981 which is fixed to the forward and reverse shift lever 958. When this lever is in a forward drive position labeled FWD on the selector box, the power line 964 is connected by contacts 981 and 978 to a line 982 connected to the solenoid valve 716 which is thus energized while a line 983 connected to the solenoid valve 715 is disconnected at the other stationary contact 980 from the power line 964 so that the latter solenoid valve is de-energized. When the forward and reverse shift lever 958 is swung counterclockwise to a reverse drive position as shown and labeled REV on the selector box, the connection to line 982 is broken so that the solenoid valve 716 is de-energized and the power line 964 is connected through contacts 981 and 980 to the line 983 so that the solenoid valve 715 is energized.

In each position of the manual and automatic range shift lever 960, only one of the five associated switches is closed by this lever, the other switches remaining open. When the manual and automatic range shift lever 960 is in a neutral position as shown and labeled N on the selector box, it closes switch 966 to connect power line 964 to a line 984 connected to the solenoid valve 774 which is thus energized. When lever 960 is swung to a first drive range position labeled 1 on the selector box it closes switch 968 to connect the power line 964 to a line 986 that is connected to solenoid valve 798 which is thus energized. When lever 960 is swung to a second drive range position labeled 2 on the selector box it closes switch 970 to connect the power line 964 to a line 988 that is connected to solenoid valve 803 which is thus energized. When lever 960 is swung to a third drive range position labeled 3 on the selector box it closes switch 974 to connect the power line 964 to both a line 990 and a line 992. Line 990 is connected to the line 986 serving solenoid valve 798 and line 992 is connected to solenoid valve 918 so that both these solenoid valves are energized when lever 960 is in the third drive range position (3) and solenoid valve 918 is not energized when the lever is in the first drive range position (1). When lever 960 is swung to the fourth drive range position labeled 4 on the selector box it closes switch 972 to connect the power line 964 to a line 994 that is connected to solenoid valve 952 which is thus energized. When the lever 960 is placed in an automatic position labeled AUTO on the selector box it does not contact any of the switches 966, 968, 970, 974 and 972 so that they are all open and thus solenoid valves 774, 798, 803, 918 and 952 are all de-energized. The gate 977 is gated so that the lever 960 can be moved to any one of its positions bypassing any intermediate switch contacting position in addition to stepped movement to successive positions, suitable biasing means, not shown, biasing the lever rightward to yielding hold it in the selected position.

MANUAL RANGE AND AUTOMATIC RANGE SHIFTING OPERATION

The control system thus far described is operable to provide both manual and automatic shifting of the power train. The schedule of operation available is shown in FIG. 5 with the letter X denoting which solenoid valves are energized in each operation.

For neutral, the operator places the manual and automatic range shift lever 960 in its N position and the forward and reverse shift lever 958 in its FWD position. This energizes both the solenoid valve 774 controlling the neutral shift valve 758 and the solenoid valve 716 controlling the forward and reverse shift valve 684. Then, when the engine 210 is started the main pressure input pump 406 supplies fluid to the main line 510 where it passes through the filter 516 before being delivered to the main pressure regulator valve 518, the forward and reverse main pressure regulator valve 560, the lockup valve 654 and the flow valve 628. Since the vehicle is at rest, there is no G1 pressure provided to the G1 line 573 and the lockup valve 654 is held in its release position. Thus, the lockup clutch motor 656 is exhausted so that the lockup clutch 238 is disengaged and no lockup signal pressure is delivered to the main pressure regulator valve 518 so that the main pressure regulator valve 518 regulates the main pressure in main line 510 at the high value. Main pressure in main line 510 is delivered by the lockup valve 654 in its release position to the converter signal line 672 to condition the converter pressure regulator valve 442 to regulate the converter-in pressure in line 440 at the high value. Fluid at the main pressure is delivered through the flow valve 628 to the range main line 626 and with the solenoid valve 774 energized the neutral shift valve 759 is conditioned in its blocking position blocking the delivery of fluid at the main pressure in the upstream range main line 626 to the downstream shift valves 820, 870 and 922 while exhausting the downstream range main line 626 to these valves. Thus, all the range drive establishing devices are disengaged so that no drive is transmitted to the power train's output shafts 292 and 304 and with the solenoid valves 803, 918 and 952 controlling the range shift valves 820, 870 and 922, respectively, all de-energized, the shift valves are held by their downshift spring bias in their downshift position.

The forward and reverse main pressure regulator valve 560 reduces the main pressure from main line 510 to a lower regulated value to provide the forward and reverse main pressure in forward and reverse main line 566. The forward and reverse main pressure in line 566 is directed to the primary TV valve 580, the secondary TV valve 582, the forward and reverse shift inhibitor valve 724, the forward and reverse shift valve 684 and the manual signal valve 780. At the primary TV valve 580 there is no TV pressure provided in the TV line 594 since the engine throttle is closed and thus neither lockup TV pressure nor T pressure is available. The forward and reverse main pressure is reduced by the secondary TV valve 582 to a lower regulated value and is delivered to the range TV line 610. The automatic shift inhibitor valve 806 is in its shift permit position since there is no steering operation and thus the range TV line 610 is connected to the range shift valves 820, 870 and 922.

Since there is no G2 pressure in G2 lines 577, the forward and reverse shift inhibitor valve 724 is in its shift permit position directing the fluid at forward and reverse main pressure to chambers 710 and 712 at the opposite ends of the forward and reverse shift valve 684. With the solenoid valve 716 energized, chamber 712 is exhausted of this pressure so that the forward and reverse shift valve 684 is conditioned in its forward engage position where it connects the forward and reverse main line 566 to the forward drive clutch motor 688 to engage the forward drive clutch 246 while exhausting the reverse drive clutch motor 692 to disengage the reverse drive clutch 252. The forward and reverse main pressure in addition to being applied to engage the forward drive clutch in also directed from the forward and reverse shift valve 684 to act on the sequence valve 746 to hold it in its 1–2 shift permit position with lubrication fluid from the lubrication line 546 being directed by the forward and reverse shift valve to fill the reverse clutch line 690 to both the reverse drive clutch motor 692 and the sequence valve 746.

The forward and reverse main line 566 also delivers fluid through orifices 801, 916 and 951 to feed the plunger chambers 868, 914 and 950 of the 1–2, 2–3 and 3–4 range shift valves 820, 870 and 922, respectively. Since solenoid valves 803, 918, and 952 of the respective range shift valves are deenergized, the respective plungers 963, 908 and 945 are held against their spring force by the forward and reverse main pressure in the positions shown to permit the range shift valves to be held in their downshift position shown.

The forward and reverse main line 566 also delivers fluid through the orifices 792 and 801 to lands $c$ and $d$ of the manual signal valve 780. Since solenoid valves 798 and 803 are de-energized, the forward and reverse main pressure acting on these two areas conditions the manual signal valve 780 in its automatic signal position connecting the T line 604 through the valve to the range shift valves 820, 870 and 922 and connecting the forward and reverse main line 566 downstream of the valve to exhaust so that forward and reverse main pressure is not delivered to act in the downshift direction on the range shift valves.

The engine driven hydrostatic supercharge-converter pump 402 supplies fluid to line 412 which delivers it to the hydrostatic supercharge pressure regulator valve 416. Valve 416 regulates to provide hydrostatic supercharge pressure in line 412 with the excess fluid directed to the converter-in line 440 where it is regulated at the high value by the converter pressure regulator valve 442 for normal converter operation. This high value of converter-in pressure is established by the converter signal pressure delivered to the converter pressure regulator valve 442 by the lockup valve 654 from main line 510 with the latter valve in its release position disengaging the lockup clutch 238. The fluid flows through the torque converter 211 with this constant flow of fluid cooling, lubricating and keeping the converter filled with fluid. The fluid leaving the torque converter via converter-out line 464 flows through the cooler 466 prior to returning to the reservoir 400. Thus, the converter is conditioned for normal converter operation.

In neutral (N) with the forward drive clutch 246 thus engaged, rotation is transmitted from the turbine 229 to the high clutch 278 and the sun gears 258 and 261 in the range unit 213, this being one end of the power path since power cannot be transmitted beyond this point with all of the range drive establishing devices 271, 276, 278 and 318 disengaged and the brake and clutch components in range unit 213 have free rotation. Rotation is also transmitted from the turbine 229 to the differential drum 251 and with the differential sun gears 336 and 339 stationary except during steer, the differential carriers 322 and 324, with their drive to sun gears 290 and 306 of the steer units, cause the pinions 287 and 301 to drive the ring gears 281 and 284, the carriers 288 and 302 being stationary while the vehicle is stationary. The ring gears 281 and 284 rotate the shaft 280 to which they are common and the connected planetary carrier 266 of the range unit. Power cannot be transmitted beyond carrier 266 permitting the free rotation mentioned above since the range drive establishing devices as previously discussed are disengaged.

In the steer system as later described in detail, no rotation is transmitted beyond the hydrostatic pump 358 which is conditioned for zero displacement since, though being rotated by turbine 229, there is no hydraulic output produced to drive the hydrostatic motor 356.

The coolant pump 470 is also rotated by the turbine 229 in neutral. Thus, in neutral and with the air valve 486 open with the vehicle brakes disengaged, the coolant pump 470 pumps only air to belljar the cavities of the hydrodynamic and mechanical brakes. If the mechanical brakes 299 and 316 are engaged in neutral as service brakes for parking or with the vehicle in motion in any of the drive ranges, the air valve 486 is closed and the coolant pump 470 then pumps fluid to the hydrodynamic brakes from which the fluid is delivered to the mechanical brakes.

MANUAL RANGE SHIFTING

The first forward drive by manual selection is established by the operator moving the manual and automatic shift lever 960 to the first drive range position (1) while the forward and reverse shift lever 958 remains in its forward drive position (FWD). The solenoid valve 798 is thus energized and relieves the forward and reverse pressure in chamber 794 of the manual signal valve 780. This permits the spring 790 to condition the manual signal valve 780 in its manual signal position where it permits forward and reverse main pressure to pass through line 566 to the pistons 861, 906 and 942 of the 1-2, 2-3 and 3-4 range shift valves 820, 870 and 922, respectively, to hold all of the range shift valves in their downshift position. With solenoid valve 774 de-energized, pressure in the neutral shift valve chamber 772 builds to full forward and reverse main pressure and conditions the neutral shift valve 759 in its range position connecting the range main line 626 therethrough. The range main line 626 is connected through the downshifted 3-4 range shift valve 922 and the downshifted 2-3 range shift valve 870 to the 1-2 line 756. The sequence valve 746 is held in its connect position by the forward drive clutch apply pressure in line 686 and thus the 1-2 line 756 is connected through the sequence valve to the downshifted 1-2 range shift valve 820. With the 1-2 range shift valve in its downshift position, the low low brake line 827 is connected to the 1-2 line 756 and thus fluid is permitted to flow to the low low brake motor 828. With this flow the flow valve 628 moves to its lockup cutoff position but since the lockup valve 654 is in its release position there is no lockup clutch release effect. This flow continues until the low low brake motor 828 is filled whereafter the range main pressure builds to full main pressure to engage the low low brake 318 and the flow valve 628 returns to its no-flow position. The 1-2 line 756 upstream of the sequence valve 746 delivers the range main pressure as a signal to the main pressure regulator valve 518 where it acts in chamber 554 to condition the main pressure regulator valve 518 to regulate main pressure in main line 510 and thus in range main line 626 and 1-2 line 756 at the high value, the pressure being used for low low brake engagement because of the high load requirements in the lowest drive range.

With the first forward drive thus established manually and when the engine 210 is accelerated, the vehicle will move by the power transmitted to the power train output shafts 292 and 304. The G1 pressure in G1 line 573 increases with increasing turbine and output speed and acts on the 1-2 range shift valve 820 to urge an upshift but is not sufficient throughout its pressure range to counteract the forward and reverse main pressure which thus holds the 1-2 range shift valve in its downshift position. Thus, the first forward drive range is maintained throughout the G1 pressure range, the 2-3 and 3-4 range shift valves 870 and 922 remaining in their downshift position with G2 pressure being zero in this drive.

In the first drive range with the manual signal valve 780 in its manual signal position, the T line 604 is blocked to prevent delivery of T pressure to all of the range shift valves but range TV pressure in line 610 is made available to all of the range shift valves; however, the range TV pressure is not required to hold the 1-2 range shift valve in its downshift position, though it aids such holding. When converter turbine speed is high enough in the first forward drive range to allow the use of the lockup clutch 238, and G1 pressure in line 639 is sufficient to move the lockup valve 654 to its lockup or apply position, the T and TV pressures inhibiting such valve movement. The TV pressure inhibits the initial movement of the lockup valve 654 giving it a snap action after it overcome TV pressure whereafter the movement is against spring 666 and T pressure when the latter is available. The check valve 676 and T pressure prevents the TV pressure from entering the T line 604 in the lockup valve release position during the time when no T pressure exists which is during light-throttle conditions below 40 percent travel in the primary TV valve 580. Above 40 percent travel with opening of the engine throttle the T line 604 is provided with TV pressure and this pressure is made available to control movement of the lockup valve 654. The T pressure at its maximum value which occurs beyond 80 percent travel of the primary TV valve element 587 with the engine throttle open through detent is sufficient to prevent movement of the lockup valve 654 to its lockup position and thus prevent lockup clutch engagement, or to force the lockup valve to its release position and thus force lockup clutch disengagement. Thus, converter operation is assured at maximum torque demand. T pressure below its maximum value delays lockup clutch engagement or hastens lockup clutch disengagement by requiring a higher G1 pressure and thus higher turbine speed to effect lockup clutch engagement. Thus, converter operation is prolonged or occurs earlier at high torque demand.

When the lockup valve 654 is moved to its lockup position, it connects the main line 510 to the lockup clutch line 668 making main pressure available to the lockup clutch motor 656 to engage the lockup clutch 238 and also making main pressure available to act on the main pressure regulator valve 518 to allow more fluid to flow into the lubrication line 546. The lubrication line 546 directs the fluid to lubricate various parts of the power train and also to keep the reverse clutch line 690 full. The lockup signal pressure (main pressure) to the main pressure regulator valve 518 results in a reduction of main pressure in line 510 during lockup operation which is permissible because lower torque at higher rotating speed is being transmitted by the power train. The lockup valve 654 in its lockup position also exhausts the converter signal line 672 so that the converter pressure regulator valve 442 then regulates at the low value appreciating that less flow to the converter is required during lockup operation.

The operator is permitted by the forward and reverse shift inhibitor valve 724 to shift from the first forward drive to first reverse drive to rapidly change vehicle direction. This is accomplished by the operator moving the forward and reverse shift lever 958 to its REV position while the manual and automatic shift lever 960 remains in its first drive range position (1). This de-energizes the solenoid valve 716 and energizes the solenoid valve 715 which valves control the forward and reverse shift valve 684. The forward and reverse shift inhibitor valve 724 remains in its shift permit position since the first drive range is being maintained in which there is no G2 pressure and thus fluid at forward and reverse main pressure remains available to chambers 710 and 712 of the forward and reverse shift valve 684. With the solenoid valve 715 energized, chamber 710 is exhausted of this pressure so that the forward and reverse shift valve 684 is conditioned in its reverse apply position where it connects the forward and reverse main line 566 to the reverse drive clutch motor 692 to engage the forward drive clutch 252 while exhausting the forward drive clutch motor 688 to disengage the forward drive clutch 246. While the reverse drive clutch 352 is being engaged the forward and reverse main pressure bias on the sequence valve 746 is relaxed, this bias having been shifted from the right end of plug 750 to between plug 750 and land b of valve element 748. With this bias relaxation the sequence valve 746 is conditioned in its release position releasing the low low brake 318. The low low brake 318 remains released while the reverse drive clutch 252 is being engaged and is not re-engaged until the full forward and reverse main pressure bias or a slightly lower bias is restored to condition the sequence valve 746 in its apply position, such pressure signifying that the reverse drive clutch 252 is conditioned to accept the load. Thus, the first drive range is disconnected in range unit 213 during change in vehicle direction from forward to reverse to provide for engagement of the reverse drive clutch under no load conditions, the same operation being provided by the sequence valve 746 on a shift from reverse to forward in the first drive range to provide for engagement of the forward drive clutch under no load conditions.

The second forward drive by manual selection is established by the operator moving the manual and automatic shift lever 960 to the second drive range position (2) while the forward and reverse shift lever 958 remains in its FWD position. This de-energizes solenoid valve 798 and energizes solenoid valve 803 while the solenoid valve 716 remains energized to maintain the forward drive clutch 246 engaged on the 1-2 upshift. With solenoid valve 803 energized, it exhausts both the chamber 802 of the manual signal valve 780 and the chamber 868 of the 1-2 range shift valve 820. The manual signal valve 780 is thus maintained in its manual signal position and the released spring bias on the upshift plunger 863 of the 1-2 range shift valve 820 immediately forces the 1-2 range shift valve to its upshift position against the downshift bias, this upshift bias being greater than any combination of downshift forces. Thus, if the operation prior to manual selection of the second drive range was in neutral or a lower drive, i.e., first, the shift to second drive occurs immediately. In the upshift position the 1-2 range shift valve 820 effects disengagement of the low low brake 318 and connects the 1-2 line 756 to the low brake line 827 to effect engagement of the low brake 271. The 1-2 line 756 continues to transmit range main pressure to the main pressure regulator valve 518 and thus main pressure is maintained at the high value in the second drive range like in the first drive range for meeting high power demands. The flow valve 628 moves to its lockup cutoff position during the filling of the low brake motor 831 to connect the G1-lockup line 639 to the G1 lockup-exhaust line 640 which is controlled by the flow valve modulator valve 646. When range TV pressure in line 610 is below a predetermined low value corresponding to a predetermined low torque demand the flow valve modulator valve 646 is in its bypass position so that G1 pressure is maintained at the lockup valve 654 and the lockup clutch 238, if it was engaged at the time the range shift was executed, remains engaged on the range shift. If the range TV pressure is above this predetermined low value the flow valve modulator valve 646 is held by spring 652 in its exhaust position to exhaust G1 pressure from the lockup valve 654 when the flow valve 628 moves to its cutoff position on the range shift to disengage the lockup clutch 238 if it was engaged at the time the range shift was executed. After such a range shift, the flow valve 628 returns to its no-flow position to re-establish lockup clutch engagement if G1 pressure and thus turbine speed continues to signal for lockup clutch engagement after the shift.

In the second drive range, G2 pressure which is proportional to output speed is made available to the forward and reverse shift inhibitor valve 724 and moves this valve to its inhibit position. This valve then blocks delivery of fluid from the forward and reverse main line 566 to chambers 710 and 712 of the forward and reverse shift valve 684 and exhausts both these chambers. This effectively locks the forward and reverse shift valve 684 in its forward clutch apply position since the chamber 710 cannot now be pressurized by operation of the solenoid valve 715 and thus shifting from forward to reverse in the second drive range is prevented. This condition is also maintained throughout the third and fourth drive ranges since G2 pressure will continue to hold the forward and reverse shift inhibitor valve 724 in its inhibit position in these drives.

The third forward drive by manual selection is established by the operator moving the manual-automatic shift lever 960 to the third drive range position (3) while the forward-reverse shift lever 958 remains in its FWD position to leave the solenoid valve 716 energized to maintain engagement of the forward drive clutch 246. Energization of solenoid valve 798 exhausts chamber 794 of the manual signal valve 780 to retain it in its manual signal position so that full forward and reverse main pressure continues to act in the downshift position on all of the range shift valves. Energization of the solenoid valve 918 exhausts the 2-3 range shift valve's chamber 914 of forward and reverse main pressure and the released spring bias on the upshift plunger 908 of the 2-3 range shift valve 870 immediately forces the 2-3 range shift valve to its upshift position, this upshift bias being greater than any combination of downshift forces. Thus, if the operation prior to manual selection of the third drive range was in neutral or a lower drive, i.e., first or second, the shift to third drive occurs immediately. In the upshift position the 2-3 range shift valve 870 disconnects the 1-2 line 756 from the range main line 639 and connects the former line to exhaust 898 to release the low brake 271 while connecting the range main line 626 to the intermediate brake line 882 to effect engagement of the intermediate brake 276. The intermediate brake line 882 in addition to supplying fluid from the range main line 626 to the intermediate brake motor 884 for intermediate brake engagement also supplies fluid through the orifice 890 to the chamber 891 behind the plunger 863 of the 1-2 range shift valve 820 to aid G1 pressure in holding the 1-2 range shift valve in its upshift position. With the 1-2 line 756 exhausted, there is no longer a pressure boost signal to the main pressure regulator valve 518 so that main pressure is then regulated at the low value in the third drive range where lower torque is being transmitted. During the shift from second to third drive (2-3 shift), the control of lockup clutch operation previously described on the 1-2 shift is also provided on the 2-3 shift.

The fourth forward drive by manual selection is established by the operator moving the manual and automatic shift lever 960 to the fourth drive position (4) while the forward and reverse shift lever 958 remains in its FWD position to leave the solenoid valve 716 energized to maintain engagement of the forward drive clutch 246. With both solenoid valves 798 and 803 de-energized, the manual signal valve 780 is conditioned in its automatic signal position relieving the forward and reverse main pressure downshift bias from all the range shift valves while providing connection in the T line 604 for transmittal of T pressure to all of the range shift valves. Energization of the solenoid valve 952 exhausts the 3-4 range shift valve's chamber 950 of the forward and reverse main pressure and the released spring bias on the upshift plunger 945 of the 3-4 range shift valve 922 immediately forces the 3-4 range shift valve to its upshift position regardless of operating conditions, i.e., the upshift bias being greater than any combination of downshift forces. Thus, if the operation prior to manual selection of the fourth drive was in neutral or a lower drive, i.e., first, second or third drive, the shift to fourth drive occurs immediately. In the upshift position the 3-4 range shift valve blocks main pressure from the 2-3 range shift valve 870 and connects the downstream side of the range main line 626 to exhaust 936 to release the intermediate brake 276 while connecting the range main line 626 at the upstream side to the high clutch line 929 to effect engagement of the high clutch 278. With both the solenoid valves 803 and 918 de-energized, the 1-2 and 2-3 range shift valves 820 and 870 are thus relieved of both the forward and reverse main pressure downshift bias and the upshift spring bias and are conditioned for automatic operation with the manual signal valve 780 in its automatic signal position. Since the 1-2 line 756 remains exhausted in the fourth drive, the main pressure regulator valve 518 continues to regulate main pressure at the low value in the fourth drive where low torque is being transmitted. The control of lockup clutch operation on the 3-4 shift is the same as that provided on the lower shifts.

Thus far the operation provided for establishment of the drive on an upshifting has been described. Describing now the downshift operation, on manual selection of the first drive the forward and reverse main pressure delivered by the manual signal valve to the 2-3 and 3-4 range shift valves 870 and 922 provides a constant downshift bias on these valves to condition them to downshift at a speed suitable for the next lower drive. Thus if the vehicle is operating in fourth drive and first drive is manually selected, the 3-4 range shift valve 922 will not downshift (4-3) until G2 pressure and thus vehicle speed reduces to a speed suitable for third drive range operation, lower drive range establishment being prevented until this valve downshifts by its control over delivery of range main pressure to the 2-3 and 1-2 range shift valves 870 and 820. The 2-3 range shift valve 870 similarly holds the third drive until G2 pressure and thus vehicle speed reduces to a speed suitable for second drive operation at which point it downshifts (3-2) to permit establishment of the second drive by the 1-2 range shift valve 820. The 1-2 range shift valve 820 is similarly held in its upshift position until G1 pressure and thus vehicle speed reduces so that the 2-1 downshift occurs at a speed suitable for first drive operation. Once the 1-2 range shift valve 820 is thus downshifted, the shifting is irreversible since G1 pressure in the first drive range is not sufficient to effect an upshift against the downshift bias provided. Thus, when the 1-2 range shift valve establishes the first drive range, this drive range is held.

On manual selection of the second drive range and if the power train is operating in a higher drive range, the G2 pressure and thus vehicle speed must be reduced through the ranges until the range shift valve downshifts. This is again accomplished by the manual signal valve establishing the forward and reverse main pressure bias on the 2-3 and 3-4 range shift valves 870 and 922. Thus, if the fourth drive is in operation on manual selection of the second drive, the range shift valves 922 and 870 will downshift at vehicle speeds suitable for the next lower drive as previously described for downshifting to the first drive. If the third drive is in operation on manual selection of second drive, the 2-3 shift valve 870 operates as previously described in the manual selection of the first drive. Once the automatic downshifting has been accomplished, the shifting is irreversible since the upshift bias on the 2-3 shift valve under the manual control condition always exceeds the downshift bias and thus the second drive is held.

On manual selection of the third drive, the forward and reverse main pressure downshift bias is again provided to the 3-4 range shift valve 922. If the power train operation is in the fourth drive prior to manual selection of the third drive, G2 pressure and thus vehicle speed must reduce to a speed sufficient for third drive operation before the 3-4 range shift valve 922 will downshift, this operation being like that described previously. When the downshift occurs, the shifting is irreversible since the upshift bias on the 2-3 range shift valve 870 always exceeds the downshift bias and thus the third drive range is held.

The combined control of the flow valve 628 and flow valve modulator valve 646 in addition to interrupting lockup clutch engagement on the upshift as previously described also provide for holding the lockup clutch 238 engaged during low speed operation in each drive range during downshifts so that the momentum of the vehicle may be utilized through engagement of a lockup clutch to motor the engine and provide power for steering. The lockup clutch is held engaged during low speed operation by the scheduling of the separate G1 pressure. The G1 pressure is determined so that it will hold the lockup valve 654 in its lockup position against the force of spring 674 in the drive ranges to a very low vehicle speed in the first drive range, e.g., 3 m.p.h. The combination of the flow valve 628 and the flow valve modulator valve 646 maintains the lockup clutch engaged during downshifts between zero and part engine throttle operation. This is provided by having the force of spring 652 in the flow valve modulator valve 646 prevail to hold this valve in its bypass position which occurs when the range TV pressure in TV line 594 is below the predetermined low value at part engine throttle mentioned previously. With this arrangement loss of drive for steering and stalling of the engine is prevented.

To operate the vehicle in reverse the operator moves the forward and reverse shift lever to its REV position. This energizes the solenoid valve 715 controlling the forward and reverse shift valve 684 to effect engagement of the reverse drive clutch 252. The same operation described above with regard to forward drive is then available in reverse drive by the operator controlling the manual and automatic shift lever 960, the solenoid valve scheduling for reverse drive being shown in FIG. 5.

AUTOMATIC RANGE SHIFTING

Automatic range shifting is established by the operator moving the manual and automatic shift lever 960 to its AUTO position and the forward and reverse shift lever 958 to either its FWD position for forward drive or REV position for reverse drive. With the vehicle stationary and all of the solenoid valves de-energized except either the directional drive solenoid valve 715 or 716, the range shift valves 820, 870 and 922 are all normally conditioned in their downshift position and the neutral shift valve 759 is held in its delivery position delivering range main pressure to the range shift valves. The manual signal valve 780 is in its automatic signal position and thus the T line 604 is open to the range shift valves. The 1-2 range shift valve 820 delivers range main pressure from the 1-2 line 756 to engage the low low brake 318 to establish first drive while disengaging the low brake 271 and the other range shift valves 870 and 922 disengage the intermediate brake 276 and high clutch 278, respectively. With the first drive thus established and as the engine throttle is opened the vehicle moves in the direction determined by which one of the directional clutches 246 and 252 is engaged.

The following operational description of the automatic range shifting is with the forward drive clutch 246 engaged by positioning of the forward and reverse shift lever 958 in its FWD position, the same operation being provided in reverse when lever 958 is positioned in its REV position to effect engagement of the reverse drive clutch 252. Acceleration of the vehicle increases G1 pressure and when vehicle speed is sufficient to require second drive range operation the G1 pressure upshift bias conditions the 1-2 range shift valve 820 in its upshift position disengaging the low low brake 318 and engaging the low brake 271 to establish the second drive.

On the shift to the second drive, the G2 pressure is then produced and when vehicle speed is sufficient to require third drive operation, the G2 pressure upshift bias conditions the 2-3 range shift valve 870 in its upshift position engaging the intermediate brake 276. The 2-3 range shift valve 870 in its upshift position disconnects the 1-2 line 756 from the range main line 626 and exhausts the former line to disengage the low brake 271 with the 1-2 range shift valve 820 remaining held in its upshift position by G1 pressure and thus the third drive is established.

When vehicle speed is sufficient to require fourth drive range operation the G2 pressure upshift bias conditions the 3-4 range shift valve 922 in its upshift position engaging the high clutch 278. The 3-4 range shift valve 922 in its upshift position also blocks flow in the range main line 626 to the 2-3 range shift valve 870 and exhausts the downstream side of this line to disengage the intermediate brake 276 with the 2-3 range shift valve 870 remaining held in its upshift position by G2 pressure and thus the fourth drive is established.

All of the automatic upshifts described above are affected by range TV pressure, this pressure inhibiting the shift from first to second, second to third and third to fourth drive. Range TV pressure has a minimum regulated value determined by the secondary TV valve 582 but is otherwise identical to the TV pressure provided by the primary TV valve 580. Thus at low torque demand where TV pressure does not exceed the minimum range TV pressure all of the automatic upshifts previously described occur at particular vehicle speeds since range TV pressure remains constant. At high torque demand where range TV pressure is identical to TV pressure and thus increases with increasing torque demand, higher governor pressure and thus higher vehicle speed is required for the automatic upshifting.

Downshifting by automatic operation is similar to upshifting but occurs in reverse sequence. In upshifts, the range shift valves are moved to their upshift position in progression (1-2 range shift valve, 2-3 range shift valve and 3-4 range shift valve). In downshifts, the range shift valves move to their downshift position progressively (3-4 range shift valve, 2-3 range shift valve and 1-2 range shift valve), the G2 pressure being required to decrease to allow the 3-4 and 2-3 range shift valves to move to their downshift position and the G1 pressure being required to decrease to allow the 1–2 range shift valve to move to its downshift position.

Automatic downshifting of the range shift valves is hastened by the delivery of the T pressure through the manual signal valve 780 when this pressure is made available by the primary TV valve 580 past 40 percent travel. Thus when T pressure is present indicating high torque demand, downshifting from fourth to third, third to second and second to first is made to occur earlier with the downshift forces for these events increasing with increasing high torque demand.

The automatic shift inhibitor valve 806 when it receives a steer signal pressure from the steer control during steering operation is moved to its inhibit position. Forward and reverse main pressure instead of range TV pressure is then delivered by the range TV line 610 to all of the range shift valves while the T line 604 to all of these valves is exhausted. The controlling range shift valve, if upshifted, thus has no T pressure downshift bias. If the controlling range shift valve is downshifted, the forward and reverse main pressure holds it in its downshifted position throughout the normal governor pressure range for the engaged drive. Thus automatic shifting is inhibited during the steering operation.

Except for the automatic range shifting described above, the control system operates the same as that described under manual operation. Thus it will be appreciated that in the event there is an electrical power stoppage while the vehicle is operating with manual drive selection, the control system will be automatically conditioned for automatic operation so that range shifting in the preselected drive direction remains available to meet varying load requirements.

HYDROSTATIC SYSTEM AND STEER CONTROLS

In the hydrostatic system, the variable-displacement hydrostatic pump 358 shown in FIG. 2d which is driven continuously while the engine is operating is connected at one of its two external ports by line 1000 to one of two external ports of the fixed-displacement hydrostatic motor 356. The pump 358 is connected at its other port by a line 1002 to the other port of the motor 356. For straight vehicle travel, the hydrostatic pump is conditioned at zero displacement so that it produces no flow or pressure to drive the motor and thus no steer bias. When steer is desired, the pump 358 is conditioned to have displacement to produce flow from either of its two ports, the flow direction determining steer direction and the amount of flow produced determining the degree of steer.

Fluid supply for the hydrostatic system and steer controls shown in FIG. 2d is from the hydrostatic supercharge-converter line 412 through a filter 1004, the hydrostatic supercharge regulator valve 416 regulating this pressure to the desired supercharge value. The fluid for the steer controls enters at the intake side of a steer control pump 1006 which is driven by the converter turbine 229 and thus rotates when the hydrostatic pump 358 rotates. The control pump 1006 further pressurizes the fluid before it is delivered to the steer controls as a main control pressure by a main control line 1008.

MAIN CONTROL PRESSURE REGULATOR VALVE

The main control pressure in main control line 1008 is regulated by a control pressure regulator valve 1010 which operates to vary the main control pressure with the effort required for steering the vehicle. Control pressure regulator valve 1010 has a pair of sleeves 1012 and 1014 and a plug 1016 which are all stationary in the valve body. The valve further has a valve element 1018 having a land $a$ located in bore 1020 of sleeve 1012 and a valve element 1022 having a land $a$ and a smaller diameter land $b$ located in a stepped bore 1026 of sleeve 1014, land $b$ extending downwardly into a chamber 1028 between sleeve 1014 and plug 1016. A collar 1030 is secured to the lower end of land $b$ of valve element 1022 and a spring 1032 located in chamber 1028 arranged between collar 1030 and plug 1016 biases both of the movable valve elements 1022 and 1018 upward. The main control line 1008 is continuously connected through ports 1034 so that the main control pressure always acts on the upper end of land $a$ of valve element 1018. This pressure bias urges the valve elements 1018 and 1022 downward against the spring bias to connect the main control line 1008 past valve element 1018 to ports 1036 which are continuously connected by an external channel 1037 in sleeve 1012 to the hydrostatic supercharge-converter line 412 whose pressure is lower and thus serves as a low pressure exhaust. Thus when main control pressure in line 1008 exceeds the bias provided by spring 1032, plus other regulating pressure forces later described, the overage from the regulating action is exhausted to the intake side of the control pump 1006.

The bias of spring 1032 is always assisted by hydrostatic pump outlet pressure to control the value of the regulated control pressure in main control line 1008 during steering operation. This is provided by connecting one port of the hydrostatic pump to bore 1026 between lands $a$ and $b$ of valve element 1022 via line 1000 through ports 1038 in sleeve 1014. Thus, when the flow is from the hydrostatic pump 358 through line 1000 to the hydrostatic motor 356, pump outlet pressure acts on the effective area of land $a$ of valve element 1022 which effective area is the full end area of land $a$ minus the full end area of land $b$ of this valve element. Thus outlet pressure from the hydrostatic pump when it is operating in this condition supplements the spring bias to increase the main control pressure in line 1008 in proportion to the increase in pump outlet pressure. The other port of the hydrostatic pump 358 is connected via line 1002 through a passage 1039 in plug 1016 to act on the full lower end area of land $b$ of valve element 1022. The full end area of land $b$ is equal in area to the effective area of land $a$ of this same valve element described above. Thus when line 1002 is delivering fluid from the hydrostatic pump 358 to the hydrostatic motor 356 the main control pressure in line 1008 is caused to increase with increasing hydrostatic pump outlet pressure by the main control pressure regulator valve 1010 in the same manner described above with flow in line 1000 from the hydrostatic pump.

STEER VALVE

Fluid in main control line 1008 is directed by a steer valve 1040 to chambers 1042 and 1043 of pump stroke control motors 1044 and 1045, respectively. The pistons 1046 and 1048 of motors 1044 and 1045 are connected by connecting rods 1050 and 1052, respectively, to the opposite sides of a tilt box 1054 which is suitably pivoted and whose angle determines the hydrostatic pump's piston stroke and thus pump displacement. The rod connections are by ball and socket joints with opposite directional movement of the connecting rods 1050 and 1052 tilting the tilt box 1054 in one direction about its pivot axis 1055 and reverse movement tilting the tilt box in the opposite direction to increase hydrostatic pump displacement from zero to a maximum value either side of zero displacement which is the condition shown. The steer valve 1040 as shown in FIGS. 2d and 3 comprises a servo valve element 1056 rotatably mounted in a bore 1058 in the valve body. The servo valve element 1056 is centered on the axis 1055 of the tilt box 1054 and is connected to pivot about this axis with the tilt box by a pin 1062.

The servo valve element 1056 has three annular channels *a*, *b* and *c* in its outer periphery closed by the bore 1058. The intermediate channel *b* is continuously connected to receive fluid from the main control line 1008, channel *a* is continuously connected to a pump stroke control line 1064 which serves pump stroke control motor 1044 and channel *c* is continuously connected to a pump stroke control line 1066 which serves the other pump stroke control motor 1045. The intermediate channel *b* is connected to a central bore 1070 in servo valve element 1056 by diametrically opposed inlet or main pressure ports 1072, channel *a* is connected to this bore by diametrically opposed control ports 1074 and channel *c* is connected to this bore by diametrically opposed control ports 1076. The pairs of control ports 1074 and 1076 are at right angles to each other and the pair of main pressure ports 1072 are located at half this angle or 45° from adjacent ports 1074 and 1076. A manually controlled steer valve element 1078 is rotatably mounted in bore 1070 of the servo valve element 1056 for establishing and controlling connection between the ports. The manual steer valve element 1078 has two pairs of diametrically opposed, longitudinally extending recesses 1080 and 1082 in its periphery closed by bore 1070, the pairs being at right angles to each other. The adjacent recesses 1080 and 1082 are separated by longitudinally extending lands 1083 which are slightly wider than the diameter of the ports in the servo valve element 1056. The recesses 1080 serve as pressure supply chambers for the control ports and recesses 1082 serve as exhaust chambers for the control ports, the recesses 1082 being connected to exhaust fluid through passages 1084 which extend axially through one end of the steer valve element 1078 for fluid return to the reservoir 400.

The servo valve element 1056 and manual steer valve element 1078 are shown in their normal relative positions with the manual steer valve element at its zero stroke position. In these positions the lands 1083 are aligned with the control ports 1074 and 1076. Between the lands 1083 and bore 1070 there is provided a clearance which permits controlled fluid flow between main pressure recesses 1080 and the control ports 1074 and 1076 and between these control ports and exhaust recesses 1082. This causes the pressure in control ports 1074 and 1076 and the respective chambers 1042 and 1043 of the stroke control motors to build to the same value to hold the tilt box 1054 at its zero stroke or displacement angle. Thus the pump stroke and displacement is held at zero and the hydrostatic pump 358 does not deliver fluid to power the hydrostatic motor 356. Then, when the manual steer valve element 1078 is rotated in either direction, the main pressure recesses 1080 are further opened to one of the sets of control ports 1074 and 1076 while the other set of control ports is further opened to the exhaust recesses 1082. For example, when the manual steer valve element 1078 is rotated clockwise as viewed in FIG. 3, the main pressure recesses 1080 are further opened to the control ports 1074 while the other control ports 1076 are further opened to exhaust recesses 1082. This causes a pressure imbalance between chambers 1042 and 1043 with the pressure increasing in the former chamber and decreasing in the latter chamber. This causes piston 1046 of control motor 1044 to move upward while piston 1048 of control motor 1045 moves downward to change the angle of the tilt box 1054 to increase hydrostatic pump stroke and displacement. Thus the hydrostatic pump 358 is caused to deliver fluid to power the hydrostatic motor 356 in one direction, fluid delivery in this condition being from pump 358 to line 1002. Since the tilt box 1054 is connected to the servo valve element 1056, the servo valve element 1056 rotates to follow the manual steer valve element 1078. When the servo valve element 1056 catches up with the steer valve element 1078, their normal relative positions are re-established with the pressure in both chambers 1042 and 1043 again equal, the displacement of control motor 1044 having increased and the displacement of the control motor 1045 having decreased. The balanced fluid pressure in the chambers 1042 and 1043 holds the tilt box 1054 in the advanced position corresponding to the advanced position of the manual steer valve element 1078 until the latter valve element is moved. With the structural symmetry provided, the manual steer valve element 1078 and the servo valve element 1056 cooperate when the valve element 1078 is rotated in the opposite direction to decrease the tilt of the tilt box 1054 and also to provide tilt in the opposite direction to reverse the direction of flow to the hydrostatic motor 356, i.e., pump flow to line 1000, so that the motor is driven in the opposite direction.

CENTERING AND STEER SIGNAL DEVICE

The steer valve 1040 is controlled from a rotatably supported steer shaft 1086 shown in FIG. 2d, this shaft being adapted for connection to a steering wheel or equivalent device for controlled turning by the operator. Rotation of shaft 1086 is converted to linear motion of a centering rod 1088 which is secured at one end to shaft 1086 and at the other end has a spherical portion engaging a transverse slot 1092 in the centering rod 1088, the supporting structure of rod 1088 being described later. Linear motion of the centering rod 1088 is converted to rotary motion of the manual steer valve element 1078 by a lever 1094 which is secured at one end to the steer valve element 1078 and at the other end has a spherical portion engaging a transverse slot 1096 on the centering rod 1088 opposite the other slot 1092.

The centering rod 1088 in addition to transmitting motion from the steer shaft 1086 to the steer valve element 1078 is also part of a centering and steer signal device 1097 which both acts on the steer valve 1040 to establish zero hydrostatic pump displacement for no steer and directs a steer signal pressure to the automatic shift inhibitor valve 806 of the range shift control during steer operation. The centering rod 1088 has a land $a$ located in a bore 1098 of a valve body 1100 and is thus supported for linear motion mentioned previously. In the right end of the valve body 1100 there is provided a threaded adjustment plug 1102 which may be advanced and retracted through a spring biased ball detent 1104. A collar 1106 abuts a nut assembly 1107 threaded on the right end of a stem 1108 projecting from the centering rod 1088. The collar 1106 is capable of leftward movement on the stem 1108 relative to the nut assembly 1107 and acts as a spring seat for concentrically arranged springs 1110 and 1112 surrounding the stem. The outer spring 1110 at its left end abuts the valve body and at its right end abuts the spring seat 1106 to urge the spring seat against a shoulder on the adjustment plug 1102. The inner spring 1112 at its left end abuts a shoulder on the centering rod 1088 and at its right end abuts the spring seat 1106 to position the centering rod. When the steer shaft 1086 and thus the steer valve 1040 are free of operator control, the outer spring 1110 holds the spring seat 1106 against the plug 1102 and the inner spring 1112 holds the centering rod 1088 in the position shown with the nut assembly 1107 against the spring seat. In this position the centering rod 1088 positions the manual steer valve element 1078 of the steer valve 1040 to establish zero displacement in the hydrostatic pump 358. When the steer shaft 1086 is rotated by the operator in a direction moving the centering rod 1088 leftward, it is forced to move against the bias of outer spring 1110, the spring seat 1106 and inner spring 1112 moving with the rod. Then when the operator releases his control the spring 1110 returns the centering rod 1088 to its normal position conditioning the steer valve 1040 to re-establish zero hydrostatic pump displacement. When the steer shaft 1086 is rotated by the operator in a direction moving the centering rod 1088 rightward it is forced to move against the bias of inner spring 1112, the spring seat 1106 remaining stationary against the plug 1102. Then when the operator releases his control the spring 1112 returns the centering rod 1088 to its normal position conditioning the steer valve 1040 to re-establish zero hydrostatic pump displacement. In addition to this centering operation the springs 1110 and 1112 also provide resistance so that the operator can feel the degree of steer he is demanding. The adjustment plug 1102 provides for fine adjustment to accurately determine the centering condition.

The movement of the centering rod 1088 in either direction from its normal position that occurs during steering is used to establish steer signal transmission to the automatic shift inhibitor valve 806. For this steer signal the forward and reverse main line 566 is connected to a closed chamber 1113 in the valve body in which chamber contains the springs 1110 and 1112. A passage 1114 in the centering rod 1088 connects chamber 1113 to the closed left end of bore 1098. The chamber 1113 is directly joined to the right end of bore 1098 and the pressure responsive areas of the rod including the left and right ends of land $a$ are sized so that there is no pressure imbalance on the rod. When the centering rod 1088 is moved leftward the land $a$ opens the bore 1098 and connected forward and reverse main line 566 to a steer signal line 1115 which directs the forward and reverse main pressure to condition the automatic shift inhibitor valve 806 in its shift inhibit position where it inhibits automatic range shifting as previously described during the steering operation that is occurring. When the centering rod 1088 is returned rightward to its normal position on the discontinuance of the steering operation the forward and reverse main pressure is blocked by land $a$ from the steer signal line 1115 which is then exhausted through an orifice 1116 by exhaust 1117 so that the automatic shift inhibitor valve 806 returns to its shift permit position, the orifice 1116 maintaining the pressure in signal line 1115 during the fluid supply. When steer is demanded in the opposite direction, the centering rod 1088 is moved rightward and the land $a$ opens the left end of bore 1098 and connected forward and reverse main line 566 to steer signal line 1115 to condition the automatic shift inhibitor valve 806 to inhibit range shifting. When the centering rod 1088 is returned leftward to its normal position on discontinuance of the steering operation the forward and reverse main pressure is blocked by land $a$ from the steer signal line 1115 which is then exhausted through an orifice 1118 by exhaust 1119, the orifice 1118 maintaining the pressure in signal line 1115 during the fluid supply.

OVERLOAD STROKE LIMITER VALVE

An overload stroke limiter valve 1120 shown in FIG. 2d under conditions which would overload the hydrostatic pump 358 interrupts the control of the steer valve 1040 so that the steer demanded by the operator is overridden to the extent of limiting steer to the degree possible without pump overload. The overload stroke limiter valve 1120 comprises a valve element 1122 having lands $a$, $b$ and $c$ of equal diameter located in a bore 1124 of a sleeve 1126 which is fixed in the valve body. In a chamber 1128 at the upper end of the valve body there is located a spring 1130 which at its upper end contacts the valve body and at its lower end contacts shoulder 1132 of a piston 1134 and to urge the piston against a shoulder 1135 provided on the upper end of sleeve 1126. Located inside spring 1130 is a cylinder 1136 having a closed-end bore 1138 in which is located the piston 1134. A spring 1139 is located in a damping chamber 1140 at the top of piston 1134, the damping chamber being connected by an orifice 1141 to the surrounding chamber 1128. The cylinder 1136 is bottomed at its upper end on the valve body and the spring 1139 biases the piston 1134 downward. The piston 1134 at its lower end has a closed-end bore 1142 in which is located a land $d$ on the upper end of valve element 1122. The spring loaded piston 1134 is contactable with the upper end of the valve element 1122 as shown with the closed upper end of bore 1142 connected by ports 1143 to receive fluid from chamber 1128.

The stroke limiter valve 1120 has similar structure at its lower end. A spring 1145 is located in a chamber 1146 in the valve body and contact shoulder 1147 of a piston 1148 to urge the shoulder and thus the piston against a step 1149 in the valve body. A cylinder 1150 located inside spring 1145 is bottomed at its lower end on the valve body and has a closed-end bore 1151 receiving the piston 1148. A spring 1152 located in a damping chamber 1154 at the bottom of piston 1148 biases the piston upward, the damping chamber 1154 being connected by an orifice 1156 to chamber 1146. The piston 1148 at its upper end has a closed-end bore 1157 in which is located a land $c$ of valve element 1122, land $c$ being equal in diameter to land $d$. The spring loaded piston 1148 is contactable with the lower end of valve element 1122 to urge the valve element upward and the closed lower end of bore 1157 is connected by ports 1158 to chamber 1146.

The valve's loading springs 1130 and 1145 which act in opposite directions on the valve element 1122 have equal spring forces as do the springs 1139 and 1152 in the damping chambers. With the spring biases thus provided in the valve, the movable parts are positioned as shown with the valve element 1122 in a pump stroke permit position. In the pump stroke permit position, the valve element 1122 connects the pump stroke control line 1064 between lands $b$ and $c$ and through ports 1159 and 1160 in sleeve 1126, the pump stroke control line 1064 leading from the limiter valve to the pump stroke control motor 1044. The valve element 1122 is movable in either direction by certain pressure differentials as later described to limit the tilt of the tilt box 1054 and thus hydrostatic pump displacement by its control over the pressure in the downstream stroke control line 1064.

One side of the hydrostatic pump 358 is connected via the line 1000 to the upper chamber 1128 of the stroke limiter valve 1120 and the other side of the pump is connected via the line 1002 to the lower chamber 1146. with the chambers 1128 and 1146 connected through the ports 1143 and 1158, to the closed end of bores 1142 and 1157, respectively, the pressure differential across the hydrostatic pump 358 is applied to act on the equal end areas of lands $d$ and $c$ of the valve element 1122, this pressure differential being zero when the hydrostatic pump 358 is at zero displacement with the hydrostatic system including the lines 1000 and 1002 supplied with fluid at the supercharge pressure as described in greater detail later. When the valve element 1122 is caused to move downward against the upward spring bias by the differential pressure across the hydrostatic pump acting thereon, it blocks the stroke control line 1064 between lands $b$ and $c$ at the upstream side while connecting the downstream side of this line between lands $a$ and $b$ to the chamber 1128 via ports 1161 in sleeve 1126 and ports 1162 in shoulder 1132 of the upper piston 1134. When the valve element 1122 is moved upward by the pressure differential against the downward spring bias, land $c$ blocks the upstream side of this line which is again connected to the upper chamber 1128, this time between lands $b$ and $c$ and then via ports 1161 and 1162.

Under steer conditions which would not overload the hydrostatic pump 358, the differential pressure between the inlet and outlet side of the hydrostatic pump is insufficient to overcome the bias of either spring 1130 or 1145, springs 1139 and 1152 providing a very small bias in comparison, so that the valve element 1122 is held in its stroke permit position to maintain connection of the pump stroke control line 1064 to deliver pressure to the pump stroke control motor 1044 to control pump stroke and thus displacement as described previously Under conditions that would overload the hydrostatic pump 358, the differential pressure across the pump is effective to move the valve element 1122 to one of its stroke limiting positions. For example, when the steer valve 1040 is controlled by the operator to effect downward movement by the stroke control motor 1044 and upward movement by the other stroke control motor 1045 which results in flow from the hydrostatic pump 358 to the line 1000 and there then occurs an increased steer demand resulting in a pressure differential across the pump signaling that the pump is at the limit of its load capacity, this pressure differential is transmitted to act across the valve element 1122. This pressure imbalance urges the valve element downward to control the pressure supplied by line 1064 to the control motor 1044. Under these conditions the line 1064 would normally be making decreasing control pressure available to the stroke control motor 1044 to permit downward movement by this motor to effect the increased steer bias being demanded. But with the stroke limiter valve element 1122 thus positioned, the high hydrostatic system pressure in line 1000 is delivered to line 1064 instead of the decreasing control pressure from the steer valve 1040 to hold the stroke control motor 1044 against further movement and thus the stroke control motor 1045 and tilt box 1054 against further movement. When the tilt box 1054 is tilted in the opposite direction by stroke control motors 1044 and 1045 under the control of the steer valve 1040 resulting in flow from the hydrostatic pump 358 to line 1002 and then further steer is demanded which would overload the hydrostatic pump, the differential pressure across the hydrostatic pump is transmitted to the stroke limiter valve 1122 to move it upward. For such a steer demand, the control line 1064 would normally be delivering increasing control pressure from the steer valve 1040 to effect the demanded increased steer bias but with the stroke limiter valve 1122 moved upward to a stroke limiting position, pump input pressure in line 1000 is instead delivered to the stroke control motor 1044. Pump input pressure is lower than the control pressure from the steer valve 1040 and thus effectively prevents the increase in hydrostatic pump displacement regardless of the steer bias demanded by the operator. Thus, regardless of which way the tilt box 1054 is being tilted to increase hydrostatic pump displacement, the overload stroke limiter valve 1120 prevents further tilting which would overload the hydrostatic pump, thereby preventing the steer demanded by the operator from overloading the hydrostatic system. In either stroke limiter position of the stroke limiter valve 1120 and when the differential pressure across the hydrostatic pump 350 reduces to below the overload value, the stroke limiter valve element 1122 is spring biased to return to its stroke permit position establishing the normal fluid delivery from the steer valve 1040 to the stroke control motors 1044 to permit the normal steer control.

SUPERCHARGE CHECK VALVES

Supercharge check valves 1164 and 1166 shown in FIG. 2d are connected between the supercharge line 412 to the intake side of control pump 1006 and the lines 1000 and 1002 between the hydrostatic pump 358 and motor 356, respectively. Since the supercharge check valves 1164 and 1166 have similar structure, the same numerals are used to identify corresponding parts. Each check valve comprises a valve element 1167 guided in a sleeve 1168 and biased upward toward a closed position by a spring 1169 and the pressure from the connected line between the hydrostatic pump and motor, this pressure being from the line 1002 in the case of check valve 1164 and from the line 1000 in the case of check valve 1166. The valve element 1167 is biased downward by the pressure from the connected hydrostatic supercharge line 412. A piston 1171 is biased downward to maintain contact with the valve element 1167 by spring 1172, the spring 1172 being located in a damping chamber 1174 behind the piston 1171. Chamber 1174 is connected by orifice 1176 to the low pressure lubrication line 546 so that the spring biased piston 1171 and damping chamber 1174 provide for damping the check valve action. The valve element 1167, in the open position shown, connects the hydrostatic supercharge line 412 through a center port 1170 and ports 1178 in sleeve 1168 to the connected line between the hydrostatic pump and motor, the check valve 1164 providing connection to the line 1002 and the check valve 1166 providing connection to the line 1000. When the check valve element 1167 is moved to its closed position it closes the port 1170 to prevent fluid delivery through the check valve.

The check valves 1164 and 1166 operate to provide additional fluid to the intake side of the hydrostatic pump 358 to maintain the hydrostatic system charged with fluid. The opening and closing of these valves is according to which of the lines 1000 and 1002 is supplying fluid to the hydrostatic pump 358. For example, when flow is to the hydrostatic pump 358 via line 1002, this low pressure which is transmitted to the check valve 1164 permits the high pressure in the hydrostatic supercharge line 412 to open the check valve 1164 to thus deliver additional fluid to the hydrostatic system at the intake side of the hydrostatic pump 358 while the high pressure in line 1000 which is delivering fluid from the hydrostatic pump is transmitted to hold the other check valve 1166 closed against hydrostatic supercharge pressure. Alternatively, when the line 1000 is delivering fluid to the hydrostatic pump 358, the pressure in this line permits the check valve 1166 to open to add fluid from line 412 to the line 1000 which then serves the intake side of the hydrostatic pump while the high pressure in the line 1002 holds the other check valve 1164 closed.

RELIEF VALVE

Pressure at the outlet side of the hydrostatic pump 358 is controlled by a hydrostatic relief valve 1180 shown in FIG. 2d which has a piston 1181 located in a bore 1182 of the valve body. A pair of springs 1183 arranged between a stationary cap 1184 and the piston 1181 biases the piston downward, there also being provided a chamber 1185 behind the piston receiving a control pressure as later described to urge the piston downward. The piston 1181 acts downward on a valve element 1186 having a land $a$ located in a valve bore 1187 of the valve body. Both the hydrostatic system lines 1000 and 1002 are connected to the valve bore 1187, the line 1002 being connected by a port 1188, and the springs 1183 in cooperation with pressure in chamber 1185 urge the valve element 1186 toward a closed position in which a valve face 1189 on the lower end of the valve element closes port 1188 to prevent connection between lines 1000 and 1002. In the closed position, the pressure responsive area of valve face 1189 exposed to the pressure in line 1002 is equal to the pressure responsive area at land $a$ exposed to the pressure in line 1000 so that the valve element 1186 is biased upward to open at the same predetermined high system pressure in either line. In the open position, the lines 1000 and 1002 are connected to prevent further increase at the high pressure or outlet side of hydrostatic pump 358. Thus the excess fluid is bypassed to the low pressure or intake side of the pump for the pressure relief. An exhaust 1190 connected to bore 1182 as shown prevents hydraulic lock.

RELIEF VALVE MODULATOR VALVE

A relief valve modulator valve 1191 shown in FIG. 2e modulates the operation of the relief valve 1180 to increase maximum pressure at the outlet side of the hydrostatic pump 358 with increasing engine throttle opening in the first drive range and decrease this pressure with increasing vehicle speed in the higher drive ranges. The valve comprises a valve element 1192 having lands $a$ and $b$ of equal diameter and a land $c$ of smaller diameter located in a stepped bore 1194 in the valve body. A spring 1198 biases the valve element 1192 rightward to an open position in which it connects the forward and reverse main line 566 between lands $a$ and $b$ to a control line 1200 that is connected to chamber 1185 of the relief valve 1180. The TV line 594 is connected to a chamber 1202 at the left end of the valve body so that TV pressure acts on the end of land $a$ to assist the spring 1198 in urging the valve element 1192 rightward. The valve element 1192 is urged leftward to connect the control line 1200 between lands $a$ and $b$ to an exhaust 1204 by G2 pressure which is delivered by the G2 line 577 to act on the right end of land $c$. The control line 1200 is always connected between lands $a$ and $b$ by a passage 1206 to bore 1194 between lands $b$ and $c$. The pressure in control line 1200 is thus delivered to act on the right end of land $b$ to urge the valve element leftward to its exhaust position to regulate the pressure in the control line 1200 according to the regulating bias provided by spring 1198, TV pressure and G2 pressure. Thus, the rightward bias increases with increasing TV pressure (engine throttle opening) to increase the control pressure in line 1200. G2 pressure is zero in the first drive range and in the higher drive ranges acts on the valve element 1192 to decrease the control pressure in line 1200 with increasing vehicle speed. Thus, the control pressure in line 1200 is at its lowest value in the first drive range at closed engine throttle (zero TV pressure) so that the relief valve 1180 opens at a low hydrostatic pump outlet pressure with the pressure at which the relief valve opens increasing with increasing TV pressure in the first drive range. In the higher drive ranges the G2 pressure decreases the control pressure in line 1200 with increasing vehicle speed and the pressure at which the relief valve opens decreases accordingly.

STEER OPERATION

Vehicle steerage by the operator controlling the steer valve 1040 is available in neutral and in all of the ranges whether they are automatically or manually selected. Steer is produced by the operator effecting rotation of the manual steer valve element 1078 in steer valve 1040 from its zero displacement position in a direction to produce the desired direction of vehicle turning and to the extent required to produce the desired degree of steer. The steer valve 1040 operates to increase the pressure to one of the pump stroke control motors 1044 and 1045 while decreasing the pressure to the other motor to tilt the tilt box 1054. This causes the hydrostatic pump 358 to pump fluid to one of the lines 1000 and 1002 to drive the motor 356 while the other line serves as a return line with the pump stroke and thus pump displacement depending on the degree of steer demanded. The tilt box 1054 is prevented from continued tilting by the servo valve element 1056 re-establishing the pressure balance at the pump stroke control motors 1044 and 1045 as soon as the tilt box reaches the angle which matches the angle through which the manual steer valve element 1078 was rotated. The tilt box 1054 is thus caused to follow the steer valve element 1078 thereby providing control over the direction of rotation of the motor 356 with infinite motor speed control for steering.

The pressure produced by the hydrostatic pump 358 in either line 1000 or 1002 dependent upon which one is receiving fluid from the pump varies with the effort required to enforce differential speed between the power train outputs to produce the steer. Thus, the demands placed on the control pressure in line 1008 to effect the hydrostatic pump stroke control varies accordingly. The control pressure regulator valve 1010 with its hydrostatic pump outlet pressure bias increases the control pressure in control line 1008 with increasing hydrostatic pump outlet pressure so that the pressure for operating the pump stroke control motors 1044 and 1045 is matched to efficiently meet the pump stroke control requirements.

The overload stroke steer limiter valve 1120 under normal steer conditions remains in the stroke permit position shown to permit normal control of the pump stroke control motors 1044 and 1045 by the steer valve 1040. During steer operation where the hydrostatic pump 358 would be overloaded, the pressure differential across the pump conditions the stroke limiter valve 1120 to interrupt control pressure from the steer valve 1040. If the stroke control piston 1046 has been displaced downward and the other piston 1048 upward to cause flow to the line 1000 from the hydrostatic pump 358, the stroke limiter valve 1120 is conditioned in its downward stroke limiting position by the overload pressure differential signal from across the pump. The stroke limiter valve 1120 then blocks control pressure delivery to the pump stroke control motor 1044 from the steer valve 1040 which is demanding further downward movement of stroke control piston 1046 and upward movement of the other piston 1048. Instead of control pressure which would be decreasing to meet the steer demand, the stroke limiter valve 1120 delivers hydrostatic pump outlet pressure from line 1000 to the stroke control motor 1044 which is effective to prevent further tilting of the tilt box 1054 regardless of the increased steer demand. When the pressure differential across the hydrostatic pump 358 drops below its overload signal value the stroke limiter valve 1120 restores the normal steer control condition. Alternatively, when the stroke control piston 1046 is upward and the other piston 1048 downward with flow to the line 1002 from the hydrostatic pump 358, the overload pressure differential signal conditions the stroke limiter valve 1120 in its upward stroke limiting position. The stroke limiter valve 1120 then blocks the control pressure delivery from the steer valve 1040 which is now demanding further upward movement of stroke control piston 1046 and downward movement of the other piston 1048. Instead of control pressure which would be increasing to meet the steer demand, the stroke limiter valve 1120 delivers hydrostatic pump inlet pressure from line 1000 which is effective to prevent further tilting of the tilt box 1054 regardless of the increased steer demand. The normal steer control condition is restored when the pressure differential drops below its overload signal value. Thus in either steer direction the stroke limiter valve 1120 is effective to override the normal steer control to limit steer to the degree possible under the load conditions.

The relief valve 1180 under the control of the relief valve modulator valve 1191 limits hydrostatic pump outlet pressure and also controls this pressure to prevent both stalling of the engine and excessive pressures during sharp turns at high vehicle speeds. In the first drive range in forward and reverse where G2 pressure is zero, the relief valve modulator valve 1191 regulates the pressure in line 1200 in accordance with TV pressure, only. The pressure in line 1200 conditions the relief valve 1180 to raise the limit on hydrostatic pump outlet pressure from its low value with increasing TV pressure (engine throttle opening) and thus increase hydrostatic pump power capacity with increasing engine throttle opening so that if steering is initiated, the pump absorption capacity is matched to the power available to prevent stalling of the engine. In each of the three higher drive ranges, the G2 pressure bias on the relief valve modulator valve 1191 decreases the pressure to relief valve 1180 from that described in the first drive range with increasing vehicle speed. Thus in all of the drive ranges above first, the hydrostatic pump power capacity is decreased from that described in the first drive range to protect the hydrostatic system from excessive pressures that would otherwise occur during sharp turns at high vehicle speeds.

The centering and steer signal device 1097 operates to provide exact positioning of the manual steer valve element 1078 in the steer valve 1040 for zero hydrostatic pump displacement upon the operator releasing his control. Thus straight-ahead or no-drift drive is assured when there is no steer demand. The centering and steer signal device also operates on steer in either direction to provide steer signal pressure to the line 1115 during automatic range shift operation. This conditions the automatic shift inhibitor valve 806 in its inhibit position to inhibit automatic range shifting as previously described under range control operation which shifting would change the steer bias from that demanded by the operator.

The above described preferred embodiment is illustrative of the invention which may be modified within the scope of the appended claims.

I claim:

1. In a control system for a power train the combination of a plurality of fluid pressure operated drive engaging means each operable on fluid pressure delivery thereto to establish a drive range; a fluid pressure source; shift means responsive to torque demand and output speed for selectively establishing fluid pressure delivery from said fluid pressure source to said drive engaging means to automatically shift drive ranges in accordance with torque demand and output speed; steer control means for providing a steering operation and a steer signal indicating the occurrence thereof; and automatic shift inhibitor means responsive to said steer signal for inhibiting automatic range shifting during said steering operation.

2. In a control system for a power train the combination of a plurality of fluid pressure operated drive engaging means each operable on fluid pressure delivery thereto to establish a drive range; a fluid pressure source; shift means responsive to torque demand and output speed for selectively establishing fluid pressure delivery from said fluid pressure source to said drive engaging means to automatically shift drive ranges in accordance with torque demand and output speed; automatic shift inhibitor means conditionable to inhibit automatic range shifting by said shift means; variable ratio hydrostatic drive means for providing a variable drive ratio controlled by control pressure delivery thereto to produce a steering operation; control pressure regulator valve means operatively connected to said fluid pressure source for providing a control pressure; steer valve means for controlling the delivery of said control pressure to said hydrostatic drive means to both vary the drive ratio and condition said automatic shift inhibitor means to prevent automatic range shifting during steering operation.

3. In a control system for a power train providing multiple drive ranges and steering operation the combination of range shift means for shifting drive ranges; automatic shift control means responsive to torque demand and output speed for controlling said range shift means to automatically shift drive ranges in accordance with torque demand and output speed; manual shift control means including power source means for controlling said range shift means to manually select the drive ranges using power from said power source means and releasing control over said range shift means to said automatic shift control means on discontinuance of power from said power source means; steer control means for controlling the steering operation and providing a steer signal indicating the occurrence thereof; and said automatic shift control means including automatic shift inhibitor means responsive to said steer signal for inhibiting automatic range shifting during steering operation.

4. In a control system for a power train the combination of a plurality of fluid pressure operated drive engaging means each operable on fluid pressure delivery thereto to establish a drive range; a fluid pressure source; primary throttle pressure regulator valve means operatively connected to said fluid pressure source for providing a TV pressure increasing with increasing torque demand and a T pressure equivalent to and derived from said TV pressure above a predetermined intermediate TV pressure; secondary throttle pressure regulator valve means operatively connected to said fluid pressure source and said primary throttle pressure regulator valve means for providing a range TV pressure having a predetermined minimum value greater than zero and otherwise equivalent to and derived from said TV pressure; first governor means for providing a G1 pressure increasing with increasing output speed; second governor means for providing a G2 pressure having a value of zero throughout the lowest drive range and increasing with increasing output speed throughout the higher drive ranges; shift valve means corresponding to each of said drive engaging means; said shift valve means operatively connected to their corresponding drive engaging means and operatively connected in series to said fluid pressure source; the furthest downstream shift valve means operable in a downshift position to establish fluid pressure delivery from said fluid pressure source to the drive engaging means that establishes the lowest drive range and in an upshift position to exhaust fluid pressure from the last mentioned drive engaging means while establishing delivery of the fluid pressure to the drive engaging means that establishes the next higher drive range; each of the other of said shift valve means operable in a downshift position to establish fluid pressure delivery from said fluid pressure source to the immediate downstream shift valve means and in an upshift position to exhaust fluid pressure from the immediate downstream shift valve means while establishing delivery of the fluid pressure to the corresponding drive engaging means; means transmitting said G1 pressure to act on said furthest downstream shift valve means for providing an upshift bias biasing said furthest downstream shift valve means to its upshift position; means transmitting said G2 pressure to act on all of the other of said shift valve means for providing an upshift bias biasing each of the other of said shift valve means to its upshift position; means normally transmitting said range TV pressure to act on each of said shift valve means only when each said shift valve means is in its downshift position for providing an upshift inhibitor bias opposing said upshift bias on each said shift valve means; means normally transmitting said T pressure to act on each of said shift valve means for providing a downshift bias biasing each of said shift valve means to its downshift position; manually controlled signal valve means for preventing said T pressure from acting on all of said shift valve means while transmitting a pressure derived from said fluid pressure source to act on all of said shift valve means for providing a constant downshift bias biasing each of said shift valve means to its downshift position; manually controlled shift controlling means corresponding to and operatively connected to each of said shift valve means for selectively providing an upshift bias on each of said corresponding shift valve means effective to immediately bias the corresponding shift valve means to its upshift position; and signal operated automatic shift inhibitor valve means for preventing transmittal of said T pressure to all of said shift valve means and transmitting a pressure derived from said fluid pressure source instead of range TV pressure to all of said shift valve means to provide a constant upshift inhibitor bias to hold each of said shift valve means in its downshift position.

5. The control system set forth in claim 4 and a steer control system for the power train, said steer control system having signal means for transmitting a signal to operate said automatic shift inhibitor valve means during steer control.

* * * * *